United States Patent
Black et al.

(10) Patent No.: US 12,061,830 B1
(45) Date of Patent: Aug. 13, 2024

(54) INTERACTIVE DISPLAY APPARATUS AND METHOD OF USE

(71) Applicant: Glass-Media, Inc., Dallas, TX (US)

(72) Inventors: Daniel Corey Black, Dallas, TX (US); Nic Joseph Logan, Dallas, TX (US); Andrew Bernett Davis, Georgetown, TX (US)

(73) Assignee: Glass-Media, Inc., Farmers Branch, TX (US)

( * ) Notice: Subject to any disclaimer, the term of this patent is extended or adjusted under 35 U.S.C. 154(b) by 0 days.

(21) Appl. No.: 18/046,362

(22) Filed: Oct. 13, 2022

Related U.S. Application Data

(60) Provisional application No. 63/262,470, filed on Oct. 13, 2021.

(51) Int. Cl.
*G06F 3/14* (2006.01)
*G06F 1/16* (2006.01)
*G06F 1/3296* (2019.01)

(52) U.S. Cl.
CPC .......... *G06F 3/1423* (2013.01); *G06F 1/1607* (2013.01); *G06F 1/3296* (2013.01)

(58) Field of Classification Search
CPC ............................ G06F 3/1423; G06G 1/1607
See application file for complete search history.

(56) References Cited

U.S. PATENT DOCUMENTS

| | | |
|---|---|---|
| 6,879,961 B1 | 4/2005 | Pathirana |
| 7,568,116 B2 | 7/2009 | Dooley et al. |

(Continued)

FOREIGN PATENT DOCUMENTS

| | | |
|---|---|---|
| EP | 2348475 A2 | 5/2012 |
| EP | 3295410 A1 | 3/2018 |

(Continued)

OTHER PUBLICATIONS

Barbara, A., & Ma, Y. (2021). Extended store: How digitalization effects the retail space design. Franco Angeli. series. francoangeli.it. https://series.francoangeli.it/index.php/oa/catalog/view/732/570/4362.

(Continued)

*Primary Examiner* — Matthew A Eason
*Assistant Examiner* — Sujit Shah
(74) *Attorney, Agent, or Firm* — Schultz & Associates, P.C.

(57) ABSTRACT

The invention disclosed provides a novel solution to the problems of the prior art. The device provides a low-cost active display system capable of use in many free-standing configurations. The device incorporates a modular design that has both reusable and non-reusable elements. The modular design further accommodates specially designed display screens which are electronically modified to match different battery configurations to maximize battery life. The device incorporates various sensors to recognize certain ambient conditions, customer proximity and customer approach direction. In one embodiment, the display largely remains dormant until a first long range trigger signal is detected, at which time the device reactivates the modified display and a second short range trigger signal is detected which then retrieves content from the memory to display it. The result is drastically extended battery life and reduced maintenance cost.

31 Claims, 24 Drawing Sheets

(56) References Cited

U.S. PATENT DOCUMENTS

| | | | |
|---|---|---|---|
| 9,560,922 | B2 | 2/2017 | Wunner et al. |
| 10,832,603 | B2 | 11/2020 | Chapuis et al. |
| 10,986,940 | B2 | 4/2021 | Smithson et al. |
| 11,238,509 | B2 | 2/2022 | Zellner et al. |
| 2004/0004457 | A1 | 3/2004 | Cochran et al. |
| 2007/0002458 | A1 | 2/2007 | Sands et al. |
| 2010/0235667 | A1* | 9/2010 | Mucignat .............. G06F 1/3203 |
| | | | 713/323 |
| 2013/0011715 | A1 | 5/2013 | Shen |
| 2016/0291681 | A1* | 10/2016 | Worthington ............ G09G 5/00 |
| 2017/0011673 | A1* | 1/2017 | Condor .................... A61L 9/14 |
| 2017/0012345 | A1 | 5/2017 | Mittelman |
| 2017/0012460 | A1 | 5/2017 | Olson |
| 2017/0124603 | A1* | 5/2017 | Olson ..................... H04L 67/52 |
| 2017/0168595 | A1* | 6/2017 | Sakaguchi ............ G06F 1/1694 |
| 2017/0262040 | A1* | 9/2017 | Lee ......................... G06F 1/206 |
| 2019/0028712 | A1 | 9/2019 | Galvez et al. |
| 2020/0036475 | A1 | 11/2020 | Okamoto et al. |
| 2021/0149485 | A1* | 5/2021 | Koki ...................... G06F 3/0418 |
| 2022/0032860 | A1* | 2/2022 | Pronina ............. H04W 52/0254 |
| 2022/0019239 | A1 | 6/2022 | Gady et al. |
| 2022/0023694 | A1 | 7/2022 | Adsett |

FOREIGN PATENT DOCUMENTS

| | | |
|---|---|---|
| RU | 2745855 C1 | 4/2021 |
| WO | 2013170303 A1 | 11/2013 |
| WO | 2014037764 A1 | 3/2014 |
| WO | 2022073978 A1 | 4/2022 |

OTHER PUBLICATIONS

Lim, Jungtaek; Shin, Dong-Hee. "Retail Store-Type Digital Signage SolutionDevelopment and Usability Test Using Android Mini PC," koreascience.or.kr. The Journal of the Korea Contents Association 2015, 15(4), 29-44. Apr. 28, 2015. htttps://www.academia.edu/80900385/Retail_Store_Type_Digital_Signage_Solution_Development_And_Usability_Test_Using_Android_Mini_PC?f_ri=1615.

"Future of POS, Proximity Sensors To Boost Sales," displaymode.co.uk. Accessed: Sep. 22, 2022. https://www.displaymode.co.uk/future-pos-proximity-sensors-boost-sales/.

"Digital signage 4.0: sensors, apps and algorithms for retail," mcubedigital.com. Accessed: Sep. 22, 2022 https://mcubedigital.com/magazine/digital-signage-4-0-sensor-apps-and-algorithms-for-retail/.

"AWM Smart Shelf," awm.tech. Accessed: Sep. 22, 2022. https://www.awm.tech/index-interactive.html.

* cited by examiner

INTERACTIVE DISPLAY APPARATUS AND METHOD OF USE

CROSS-REFERENCE TO RELATED APPLICATIONS

This application claims priority benefit from U.S. Provisional Application No. 63/262,470, filed on Oct. 13, 2021. The patent application identified above is incorporated here by reference in its entirety to provide continuity of disclosure.

FIELD OF THE INVENTION

The present invention relates to digital display devices and more particularly to free standing disposable display devices such as used for end cap advertising in a retail environment.

BACKGROUND OF THE INVENTION

Brick and mortar retail stores often rely on visual display mechanisms to compete for and hold customer attention. Aisle displays and end cap displays are examples of these mechanisms. They are used to capitalize on the physical presence of the consumer in the store to promote and enhance sales of products.

The use of in-store displays provides a distinct competitive advantage that increases product awareness and sales velocity. Studies have shown that products advertised on in-store displays typically sell faster and in greater numbers than products on normal shelves in the store.

In-store displays are typically standalone structures that incorporate various static advertising features such as pictures and logos to promote impulse purchasing. Displays are often portable and can be reusable or disposable. If disposable, a display generally has a useful lifetime and is then retired. If reusable, the display must be periodically cleaned and maintained.

Referring to FIG. 1, in the prior art, in-store displays often are a part of advertising campaigns. Campaigns also have defined beginning and ending dates. In-store displays are set to be deployed at the beginning dates, interacted with by the consumers, if applicable, cleaned or restocked and otherwise maintained during the campaign and finally "retired" and disposed of at the end of the campaign.

Despite the advantages of in-store displays, many challenges exist in their deployment and retirement. For example, in-store displays are expensive to place in a retail environment. Display space is often leased or funded monthly by the retailer. Therefore, it is a challenge to minimize the time and effort required for development and deployment of the display.

Maximizing customer interaction with an in-store display is another challenge. It is well known that human vision has evolved to function essentially as a motion detection system. Hence, the shape, color, and moving parts of a display are all critical to success in conveying a message. However, in the past there is a lack of display technology which provides an easy way to customize display shape, color and visual motion quickly and cheaply.

Maintaining in-store displays is another challenge. In the past, displays which are in need of maintenance or repair are often not serviced until the end of the campaign. For example, batteries that need replacement often cause active displays with LED lights to go dark and stay dark for extended periods of time, reducing display appeal and effectiveness. Hence, there is a need for a display that has a long shelf life and requires little or no maintenance.

A related problem is activation of active in-store displays. Prior art in-store dynamic displays are either constantly active or require daily activation and deactivation. Constantly active displays consume a great deal of power and so have a short battery life. Displays that are activated and deactivated daily require too much maintenance to be cost-effective.

Another challenge is the disposable nature of prior art in-store displays. At the end of an advertising campaign, displays are usually collected and discarded. However, discarding of retired in-store displays is wasteful and inefficient, thereby unnecessarily raising the cost of the campaign. Hence, there is a need for a display that has both an easily changed "skin" that is disposable and a core frame that is easily reusable.

Another challenge is updating the advertising message on an in-store display. Prior art in-store displays do not provide an easy way to change the advertising message displayed. Most often each display is a "one-off" that is completely redesigned for each campaign and for each advertiser. The inability to easily change an advertising message reduces the shelf life of the display and requires a constant rotation cycle by the advertiser to maintain fresh content.

A related challenge is that customer interaction with retail stores is changing. With the advent of smart phones, the Internet and online advertising, average customer attention span has decidedly decreased. Online sales have reduced the foot traffic in retail stores and so have also reduced the overall contact that consumers have with in-store displays. Hence, there is a need to change the content of in-store displays with great frequency.

The prior art has attempted to address many of these challenges but thus far, has fallen short.

For example, U.S. Publication No. 2017/0124603 to Olson provides a battery powered interactive display device which is connected to a remote server and which uses sensors to activate the display. However, Olson fails to disclose easily reusable system which has a modular design that incorporates both a static and dynamic elements mounted on a changeable substrate along with a reusable and reprogrammable modular controller which has a display that is electronically tailored for battery conservation.

Another example is U.S. Publication No. 2017/0123450 to Mittelman. Mittelman discloses a battery powered display device which is connected to a server and uses sensors. The device enters a sleep mode to conserve battery power. However, Mittelman fails to disclose a modular system which is electronically tailored to match battery type with display type and which uses multiple types of ranging sensors to change power consumption during sleep mode.

Likewise, U.S. Publication No. 2022/0192394 to Gady, et al., discloses a display for products in a retail store with sensors for detecting customers of digital products. However, Gady fails to disclose a modular system with reusable components would include both static and dynamic displays for customer engagement.

European Publication No. EP2348475A2 to Lungu, et al., discloses the battery powered tabletop display system, which includes wireless communication for content update. However, Lungu fails to disclose a modular component based system which is electronically tailored for battery conservation or disposable eye catching static display elements.

The prior art has also failed to devise a system which incorporates effective and frequent content refresh in an efficient and low-cost digital platform. As a result, prior art displays are less efficient and less effective than they could be in attracting and holding customer attention.

The prior art has also failed to provide a method for adequately deploying, maintaining and reusing certain modular elements in in-store displays.

The prior art has also failed to provide the use of multiple sensor types in an arrangement to conserve battery power and extend display shelf life.

SUMMARY OF THE INVENTION

The invention disclosed provides a novel solution to the problems of the prior art. The device provides a low-cost active display system capable of use in many free-standing configurations. The device incorporates a modular design that has both reusable and non-reusable elements. The modular design further accommodates specially designed display screens which are electronically modified to match different battery configurations to maximize battery life. The device incorporates various sensors to recognize certain ambient conditions, customer proximity and customer approach direction. In one embodiment, the display largely remains dormant until a first long range trigger signal is detected, at which time the device reactivates the modified display, and a second short range trigger signal is detected which then retrieves content from the memory to display it. The result is drastically extended battery life and reduced maintenance cost.

In another embodiment, the device is part of a cloud-based network that provides dissemination of content from a remote content management system. The system also provides for a bulk deployment of content from one or more advertisers across all devices from one centralized location to minimize the time required for content updates. Each device also provides a local user interface that allows for updates to locally stored content.

In another embodiment, the technical solutions provided include a system which incorporates a modular electronic controller actively connected to a set of sensors and communication devices to provide both a static and dynamic display format which can be easily and frequently changed with a minimum of cost and providing certain modular component reuse.

In another preferred embodiment, the system provides a server based management system for tracking data gathered from each display throughout a campaign lifetime.

In another preferred embodiment, custom assembly of each display is accomplished through the use of static substrates of various shapes and sizes which accommodate a reusable modular digital module.

In another preferred embodiment, the in-store display is provided with processor which can receive instructions from the server and alter certain physical programming of the digital module to update campaign messages and processor operation.

In another preferred embodiment, a digital display is electronically modified to match certain battery types to extend battery lifetime in each case.

In another preferred embodiment, the digital module is programmed with a variety of instructions which maximize battery life and minimize maintenance requirements.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness. Unless otherwise described the term "about" means±20%.

Figure 1:
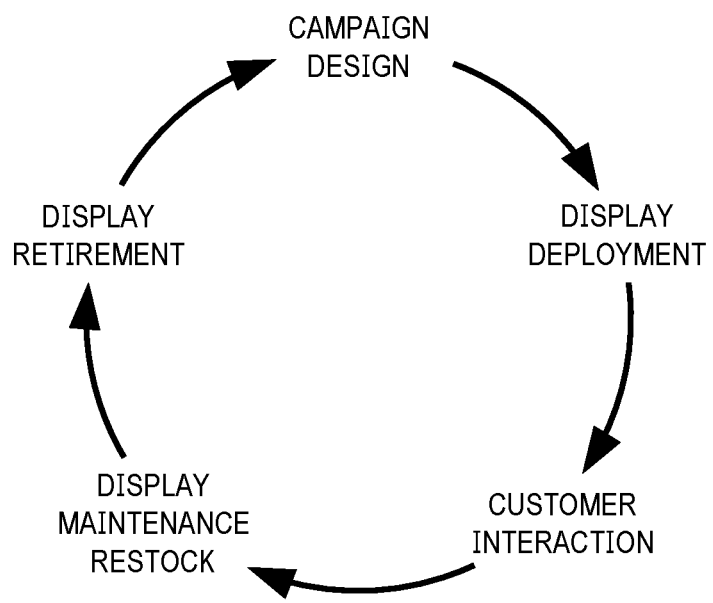
FIG. 1 is a flow diagram of a prior art display campaign life cycle.
Figure 2A:
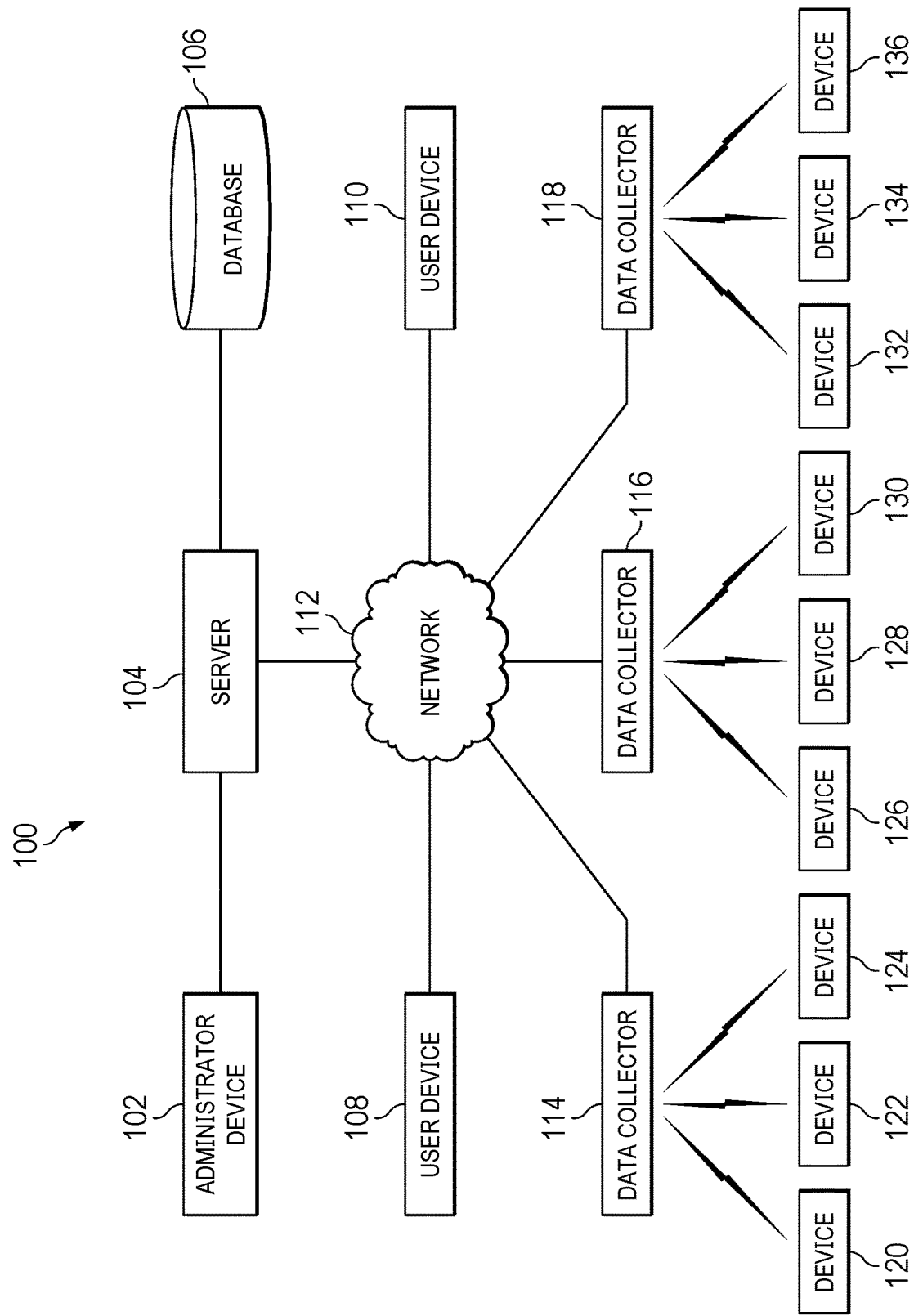
FIG. 2A is a preferred embodiment of a system to control and maximize display effectiveness.

Referring to FIG. 2A, preferred system 100 will be described. System 100 comprises administrator device 102 connected to internet 112 through server 104. The system also includes database 106 connected to server 104 for storage and retrieval of advertising content.

User device 108 and user device 110 are connected to internet 112 and communicate with the administrator device. Data collector 114, data collector 116, and data collector 118 are also connected to internet 112. The user devices also communicate with the display devices through the server and the data collectors. Display devices 120, 122, 124, 126, 128, 130, 132, 134 and 136 receive distributed content from and send updated messages through the data collectors.

Preferably, the administrator device is a smart device, such as a computer, tablet or cell phone including a web application. Similarly, each user device is a smart device such as a computer, tablet or cell phone and includes a web application. The server is preferably a pooled centralized server resource that is accessed through the internet. The database is preferably an IBM cloud-based SQL database platform. Each data collector is preferably a model no. AMS-2111 Industrial 801.11b/g/n wireless LAN access point, available from Antaira Technologies of Brea, California, and properly configured to communicate with each of the display devices and the internet.

Figure 2B:
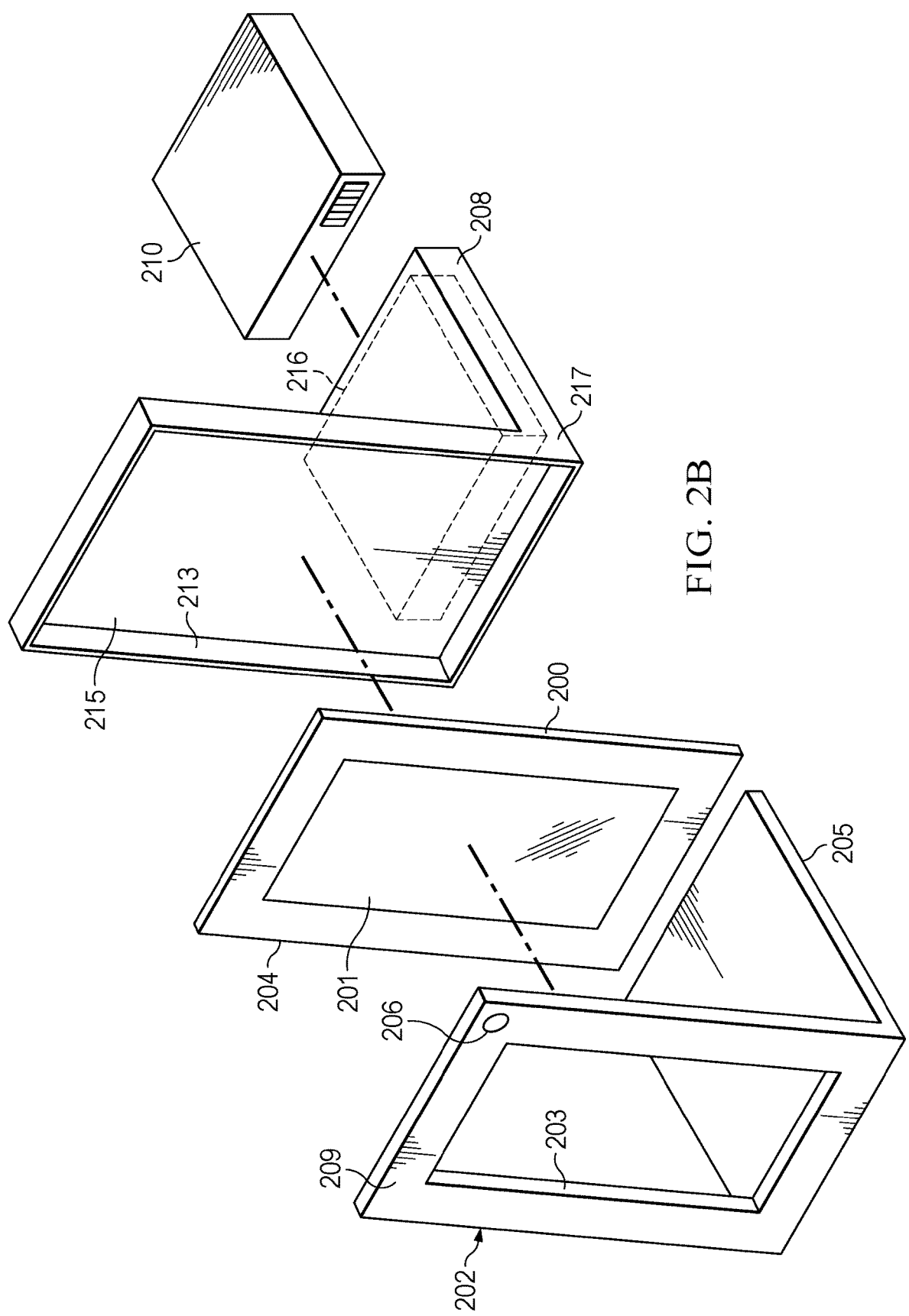
FIG. 2B is an exploded view of preferred embodiment of a modular display device.

Referring to FIG. 2B, each display device comprises substrate 202 which is preferably constructed of a semi-rigid fiberglass, PVC, plexiglass, or Lexan. Each substrate is typically colored or patterned for a specific advertising campaign and can be disposable. Substrate 202 includes base support 205 integrally formed with face frame 209. The shape of the substrate may have many configurations, as will be further described. The substrate includes transparent "window" or cutout opening 203 in face frame 209. Mounting frame 208 is comprised of support recess 213 surrounding backplane 215. Backplane 215 is integrally formed with battery mount 217. Battery mount 217 includes battery compartment 216 which is adapted to receive battery 210 and electronically connect it to electronic display module 204. Electronic display module 204 is sized to fit within support recess 213. Electronic display module 204 is further comprised of control board 200, display 201, and appropriate connections for the battery and sensors, as will be further described. Preferably the display is rigidly fixed to the circuit board in a unitary fixed epoxy package. When the display device is assembled, battery mount 217 is positioned on base support 205, adjacent the back surface of the face frame to position and hold the display device adjacent the opening. Sensor 206 is connected to electronic display module 204 by a ribbon cable (not shown) which allows it to be mounted in the substrate in any position, relative to the display module. In each embodiment, more than one sensor, and more than one sensor type may be mounted in the substrate and connected to the display module, as will be further described.

Figure 2C:
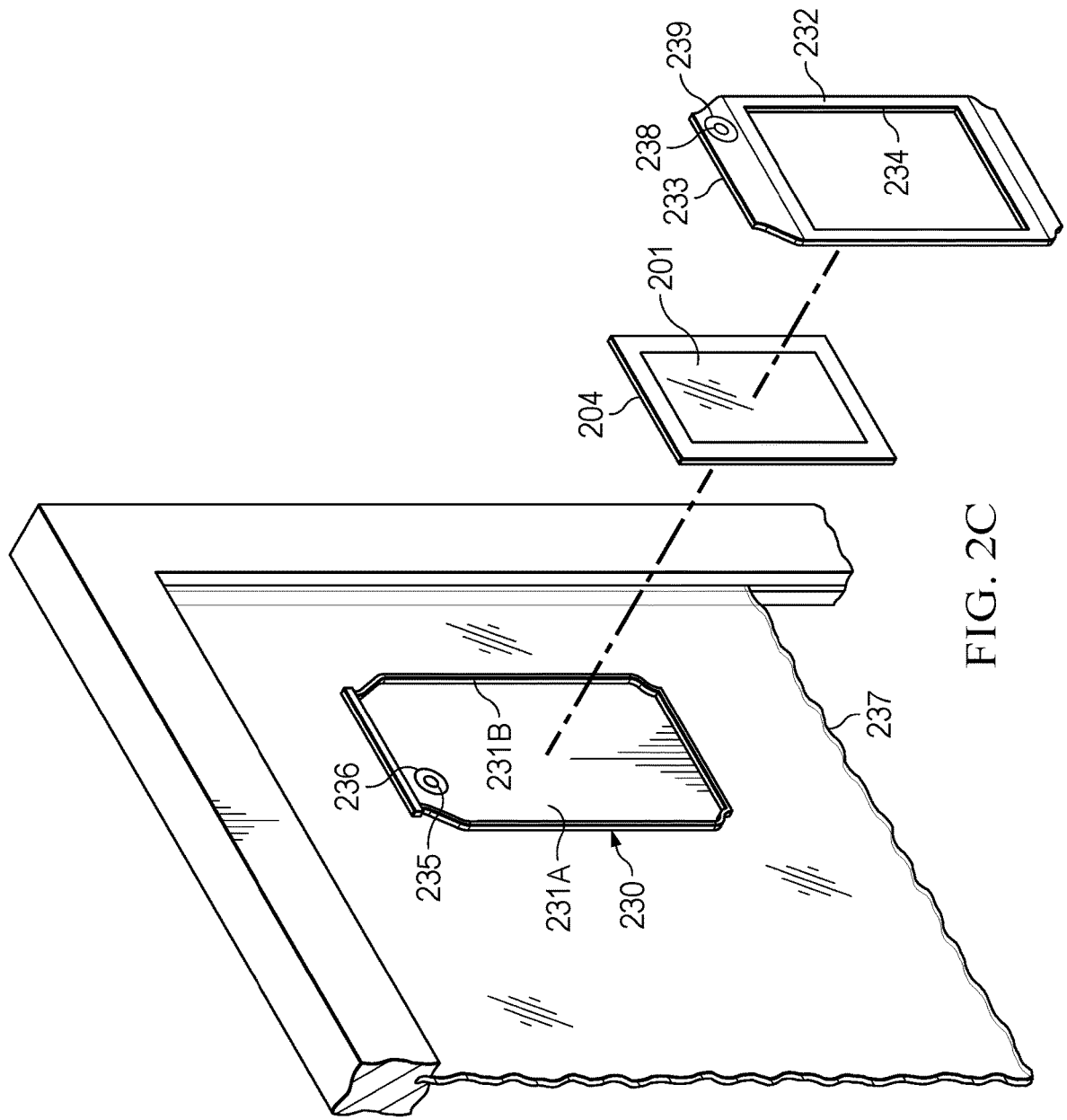
FIG. 2C is an exploded view of preferred embodiment of a modular display device.

Referring to FIG. 2C, another preferred embodiment will be further described. Electronic display module 204 is configured to be attached to a glass display door 237 by substrate 230 and face frame 232. In a preferred embodiment, the glass door is included in a refrigerated display cabinet. Substrate 230 includes backplate 231A and raised sidewalls 231B. The substrate is preferably manufactured from a semi-rigid PVC plastic and is designed to be reusable. Backplate 231A further incorporates through hole 236. Raised sidewalls 231B are formed to match the shape of perimeter 233 of face frame 232. Face frame 232 is removably retained in substrate 230 by a press fit within raised sidewalls 231B. Face frame 232 is typically colored and adorned with messaging for a particular campaign and is disposable. In this embodiment, the substrate perimeter is formed in the non-uniform outline of a beverage can. But of course, may take on other shapes. Face frame 232 further comprises window 234. Window 234 is sized to accommodate display 201 and hide the remainder of electronic display module 204. Substrate 230 further comprises temperature sensor 235, fixed in through hole 236. Temperature sensor 235 is positioned against glass display door 237 and preferably maintained in thermal contact with glass display door 237 with conductive paste. Temperature sensor 235 is operatively connected to the electronic display module, as will be further described. Face frame 232 further comprises proximity sensor 238 mounted in through hole 239. Proximity sensor 238 is forward facing and is operatively connected to the electronic display module, as will be further described.

Figure 2D:
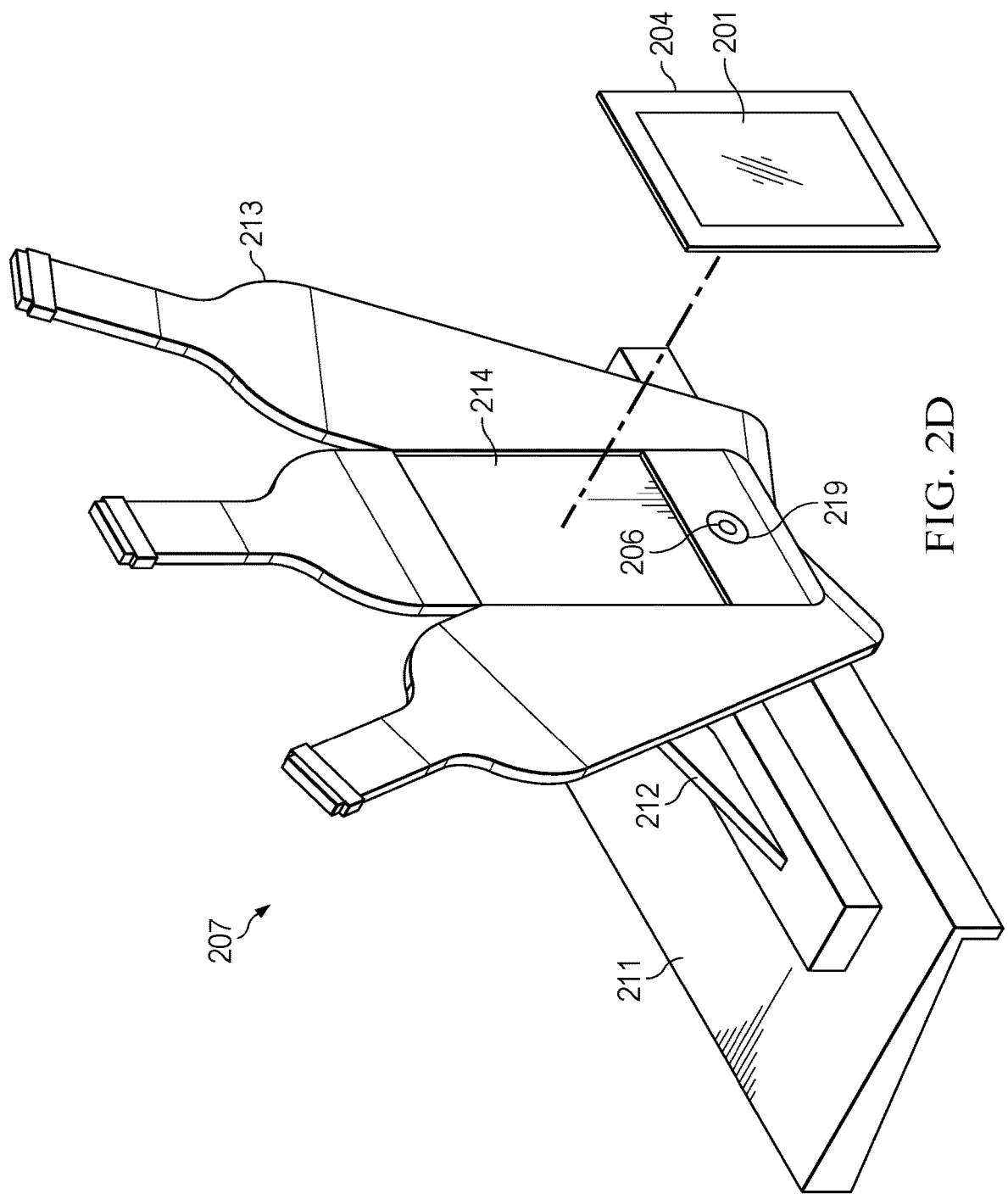
FIG. 2D is an exploded view of preferred embodiment of a modular display device.

Referring to FIG. 2D, another preferred embodiment will be further described. Electronic display module 204 is configured to be supported by separate reusable rigid back stand 207. The rigid back stand further comprises base 211, fixed to angular bracket 212. Angular bracket 212 is fixed to a display facing 213. The display facing is typically adapted in shape and color for different advertising campaigns and is disposable. The sensor is electronically connected to the display module behind the display facing. In this embodiment, display facing 213 is formed in the non-uniform outline of wine bottles. However, other exterior shapes may be employed. Display facing 213 includes a recessed docking bay 214. Electronic display module 204 is removably fixed in docking bay 214. Display facing 213 further comprises recessed mounting port 219 housing forward facing sensor 206.

Figure 2E:
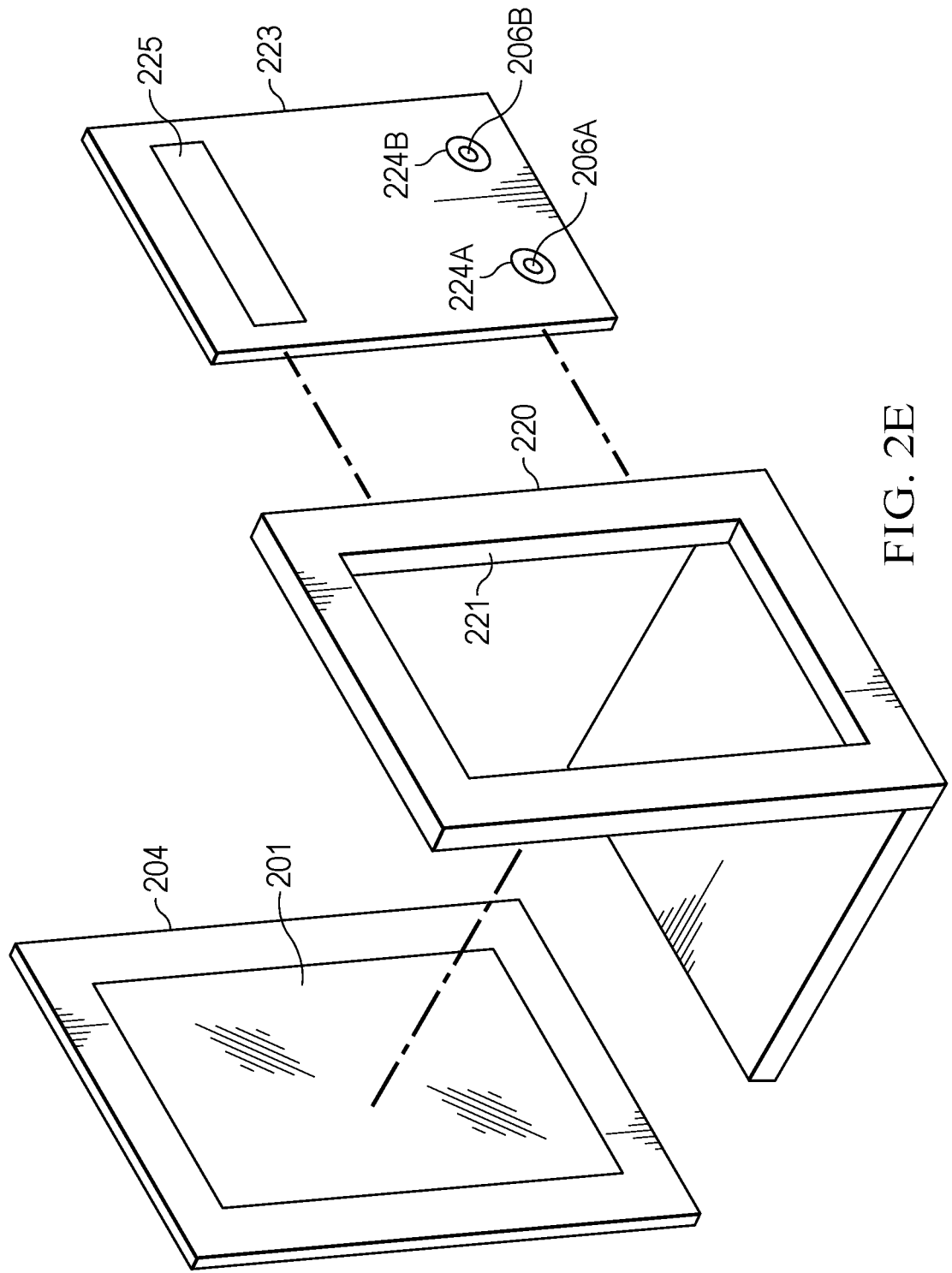
FIG. 2E is an exploded view of preferred embodiment of a modular display device.

Referring to FIG. 2E, another preferred embodiment will be further described. Angled base support 220 can be configured to rest on a horizontal surface. The angled base support is made of PVC and is typically colored and adorned for a specific advertising campaign and is disposable. Angled base support 220 includes an open mounting window 221. Electronic display module 204 is attached to the backside of the angled base support adjacent the open mounting window by a suitable adhesive tape.

Auxiliary display unit 223 is attached to angled base support 220 adjacent the open mounting window. The auxiliary display unit includes recessed port 224A and recessed port 224B. Sensors 206A and 206B are fixed in the recessed ports and are operatively connected to the electronic display module. Auxiliary display unit 223 further comprises pixelated display 225. The pixelated display is operatively connected to the electronic display module through a data port, as will be further described. In one preferred embodiment, the pixelated display is part number ASD2431-R available from Digi-Key Electronics of Thief River Falls, Minnesota. In another embodiment, the pixelated display is a low power LCD display, part number NGD-0108HZ-FSW-GBW, available from Digi-Key.

Figure 2F:
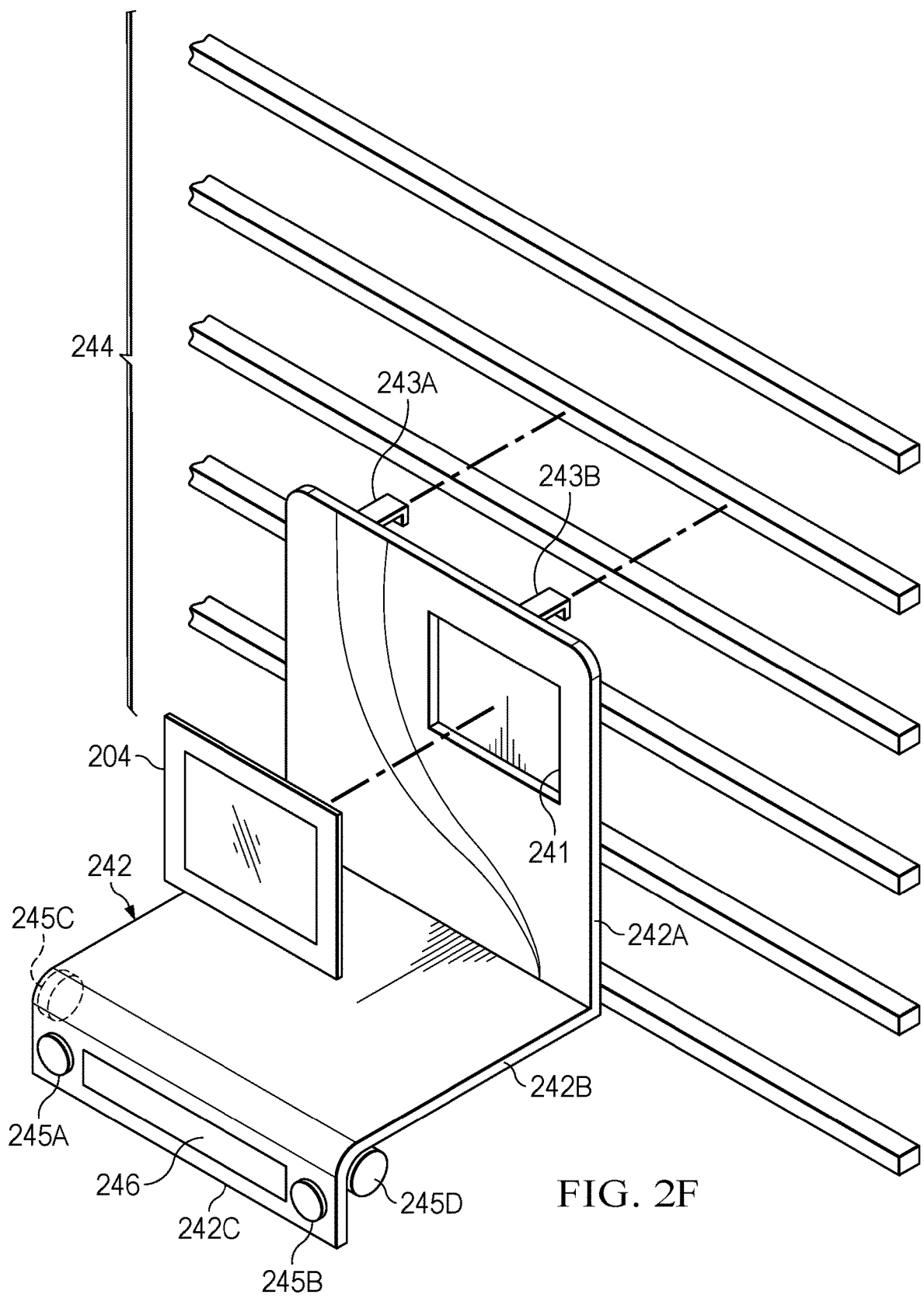
FIG. 2F is an exploded view of preferred embodiment of a modular display device.

Referring to FIG. 2F, another preferred embodiment will be further described. Electronic display module 204 is removably fixed in recess 241 of dogleg support 242. Dogleg support 242 is made from PVC and is colored and decorated for a specific advertising campaign and is disposable. Dogleg support 242 is further comprised of vertical section 242A integrally formed with horizontal section 242B and display section 242C. Preferably, the vertical section and the horizontal section are connected at about a right angle.

Vertical section 242A is fitted with hooks 243A and 243B which are adapted to removably engage stringers 244.

Display section 242C further comprises forward facing sensors 245A and 245B. The sensors are preferably mounted to the display section by a suitable adhesive. Display section 242C further comprises port and starboard side facing sensors 245C and 245D. The perimeter sensors are particularly important in sensing the approach of customers from either side so that the display may be activated before the customer is directly in front of the display so that the engagement time of the customer with the content is maximized. Display section 242C further comprises pixelated display 246, as previously described. The sensors and the pixelated display are operatively connected to the electronic display module, as will be further described. Forward facing sensors and side facing sensors may be included in all embodiments of the modular display.

Figure 2G:
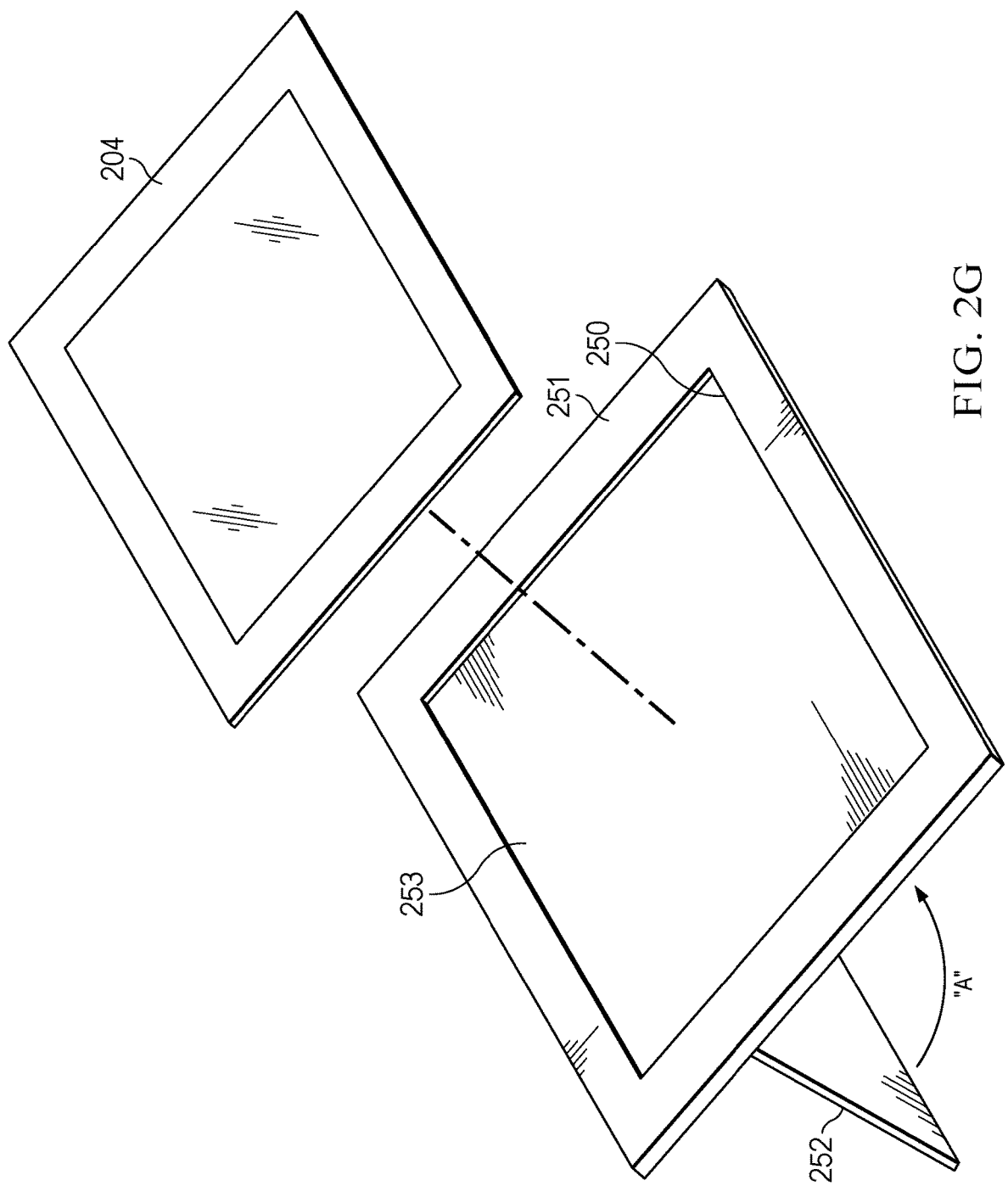
FIG. 2G is an exploded view of preferred embodiment of a modular display device.

Referring to FIG. 2G, another preferred embodiment will be further described. Electronic display module 204 is removably fixed in recess 250 of docking frame 251. The docking frame is made of PVC and is disposable. Preferably, recess 250 is integrally formed in the docking frame. The docking frame is preferably integrally formed with planar back support 253. The planar back support can be configured with hinged angled stand 252. The hinged angled stand can be folded flush against planar back support 253 in direction "A".

Figure 2H:
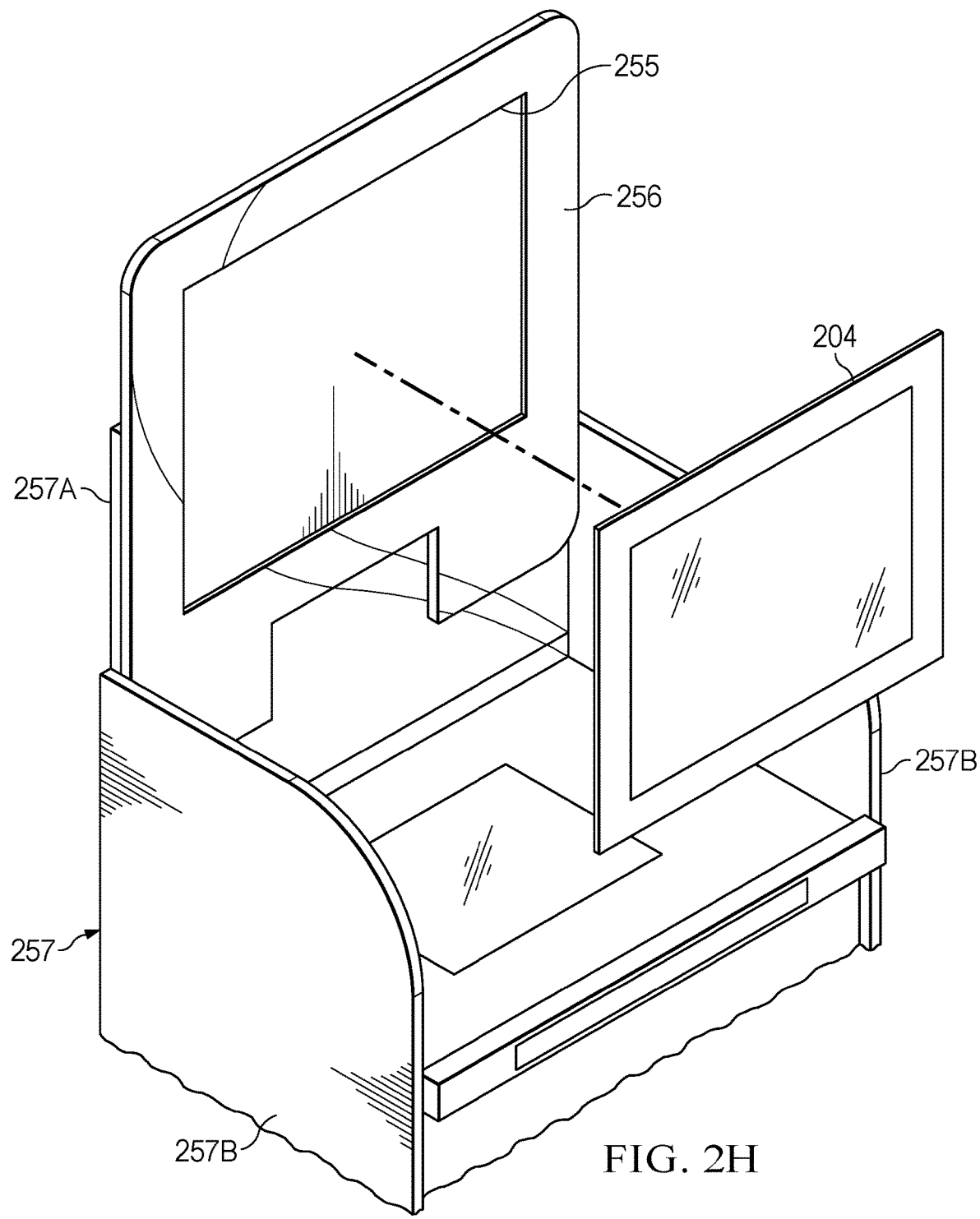
FIG. 2H is an exploded view of preferred embodiment of a modular display device.

Referring to FIG. 2H, another preferred embodiment will be further described. In this embodiment, electronic display module 204 is removably fixed in recess 255 of substrate 256. Substrate 256 is made of PVC and is disposable. Substrate 256 is removably fixed to point-of-purchase display 257. The substrate is supported by back 257A and walls 257B of the point-of-purchase display.

Figure 2I:
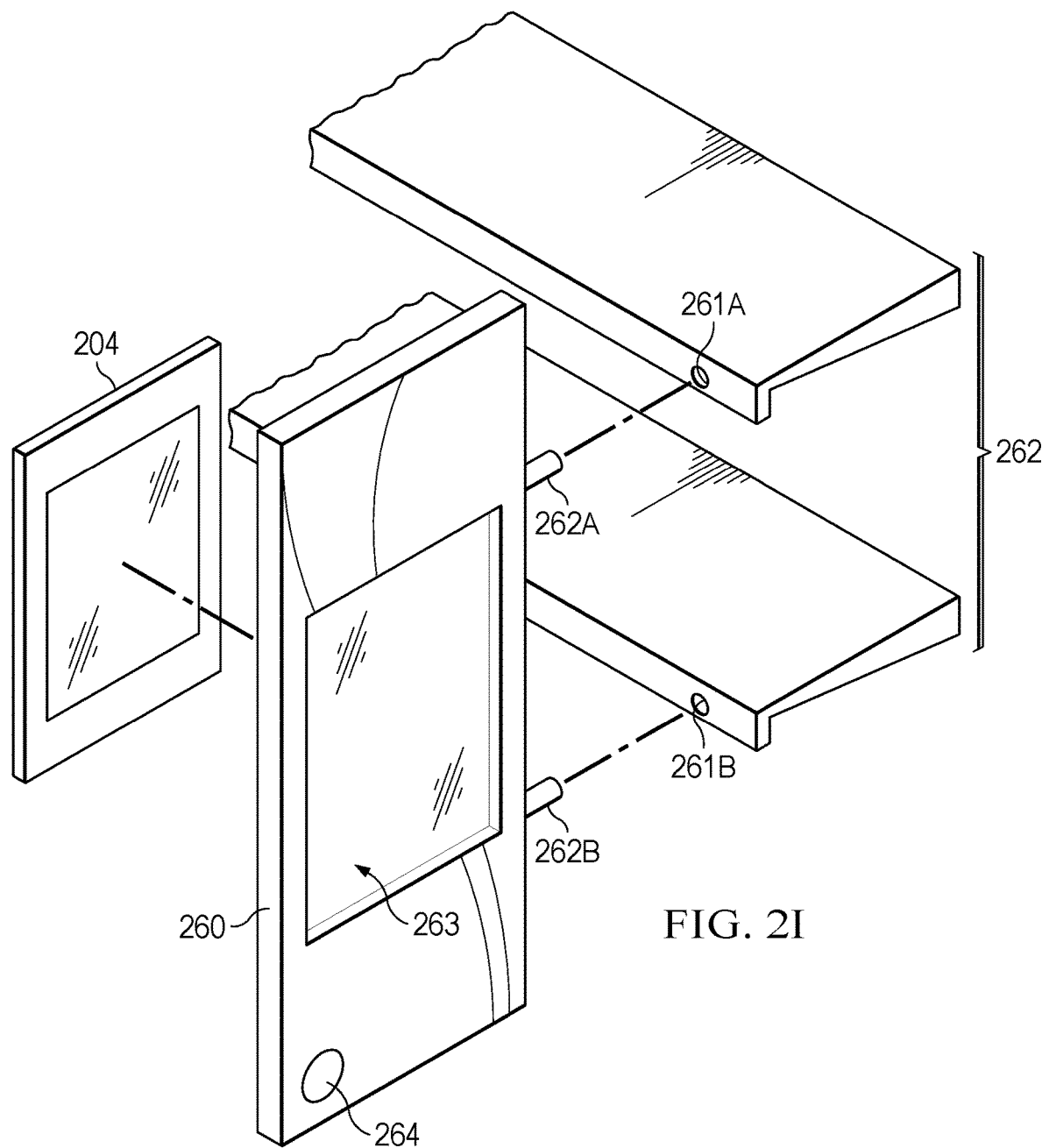
FIG. 2I is an exploded view of preferred embodiment of a modular display device.

Referring to FIG. 2I, another preferred embodiment will be described.

Disposable substrate 260 is provided with connector pegs 262A and 262B. Shelf system 262 includes connector holes 261A and 261B. The shelf connector holes mate with the connector pegs to fix the substrate to the shelf system, at an angle generally perpendicular to shelf system 262. Disposable substrate 260 includes center transparent window 263. Display 201 of electronic display module 204 is arranged to be visible through center transparent window 263. Electronic display module 204 is preferably fixed to disposable substrate 260 with a removable adhesive. Sensor 264 is preferably integrally formed in the bottom quadrant of the disposable substrate.

Figure 2J:
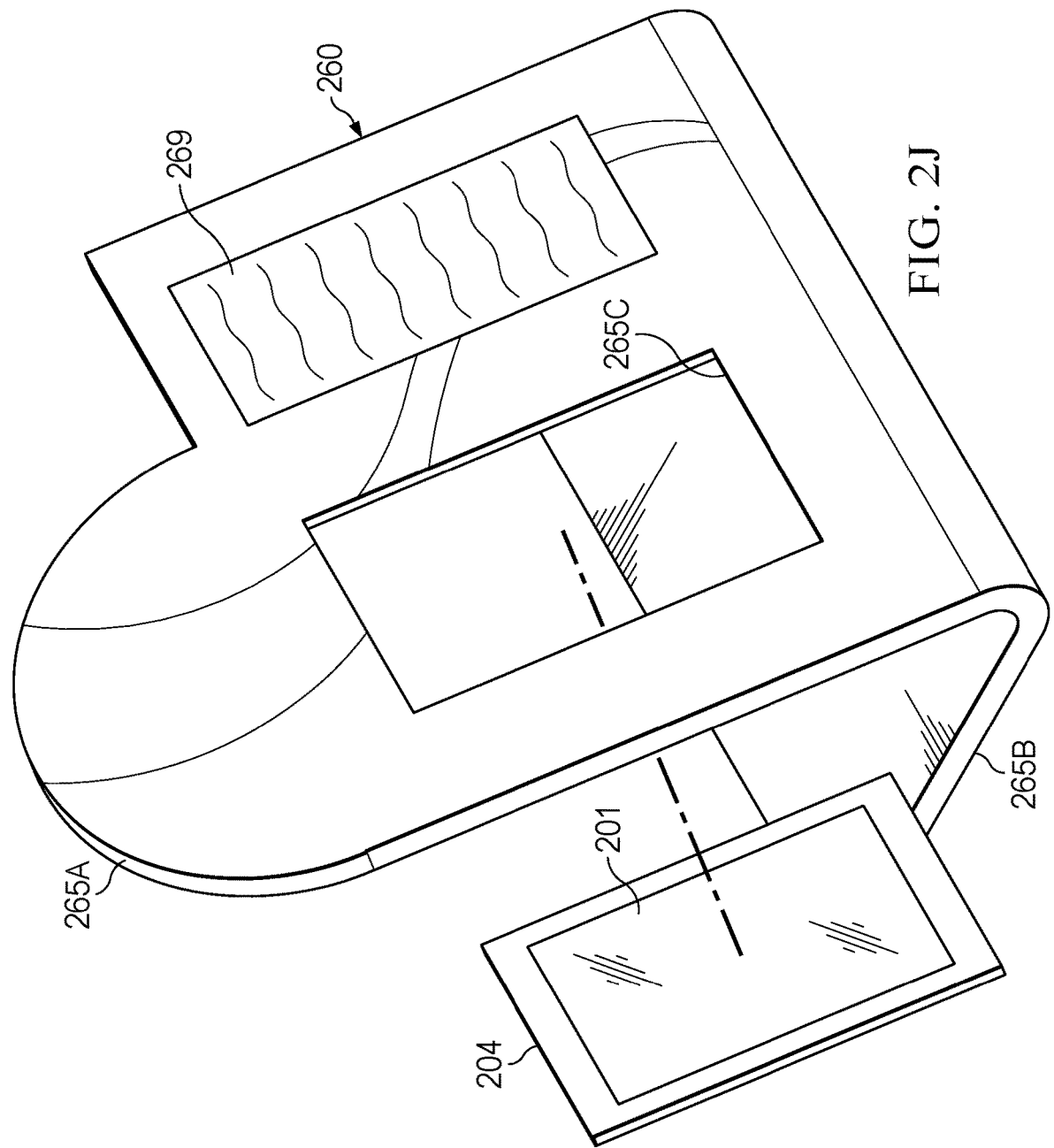
FIG. 2J is an exploded view of preferred embodiment of a modular display device.

Referring to FIG. 2J, another preferred embodiment will be described. Disposable substrate 260 includes angled display section 265A integrally formed with base support 265B. The angled display section can be formed in a non-uniform outline having various curved and square corners, but of course other shapes are possible. Further, the disposable substrate includes an opaque coating applied to its rear surface to mask portions of electronic display module 204 other than display 201. The base support can be configured to support static message area 269. Angled display section 265A includes cutout window 265C. Electronic display module 204 is fixed to the back of the angled display section with a suitable adhesive. Display 201 is positioned adjacent cutout window 265C.

Figure 2K:
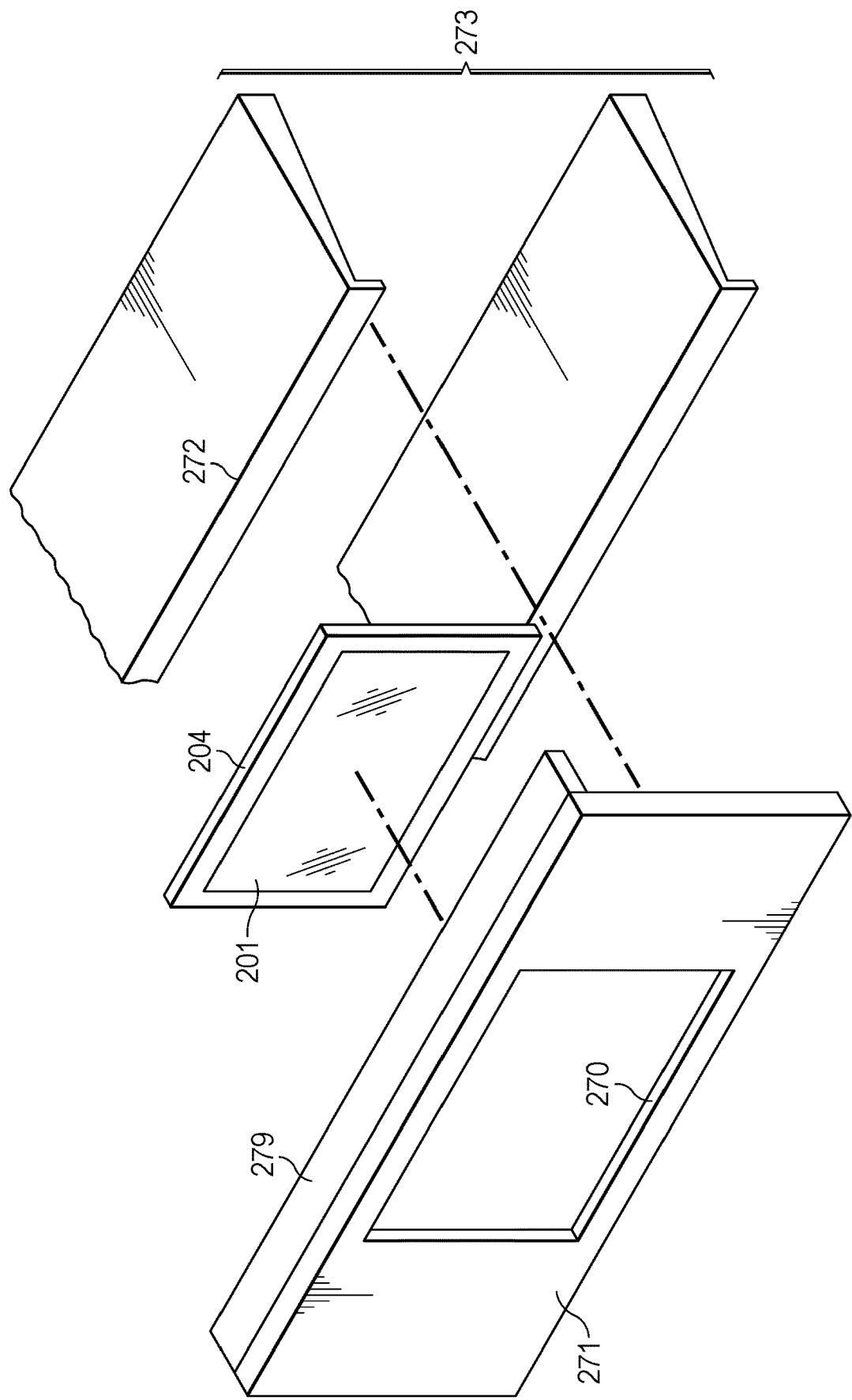
FIG. 2K is an exploded view of preferred embodiment of a modular display device.

Referring to FIG. 2K, another preferred embodiment will be described. In this embodiment, electronic display module 204 is fixed behind cut-out window 270 in disposable substrate 271 and positioned so that display 201 shows through the cut-out window. Disposable substrate 271 is integrally formed with longitudinal top bracket 279. Longitudinal top bracket 279 is preferably attached to the shelf edge by double sided tape. The substrate is attached to shelf edge 272 of shelving set 273 at an angle parallel to the shelf by longitudinal top bracket 279.

Figure 2L:
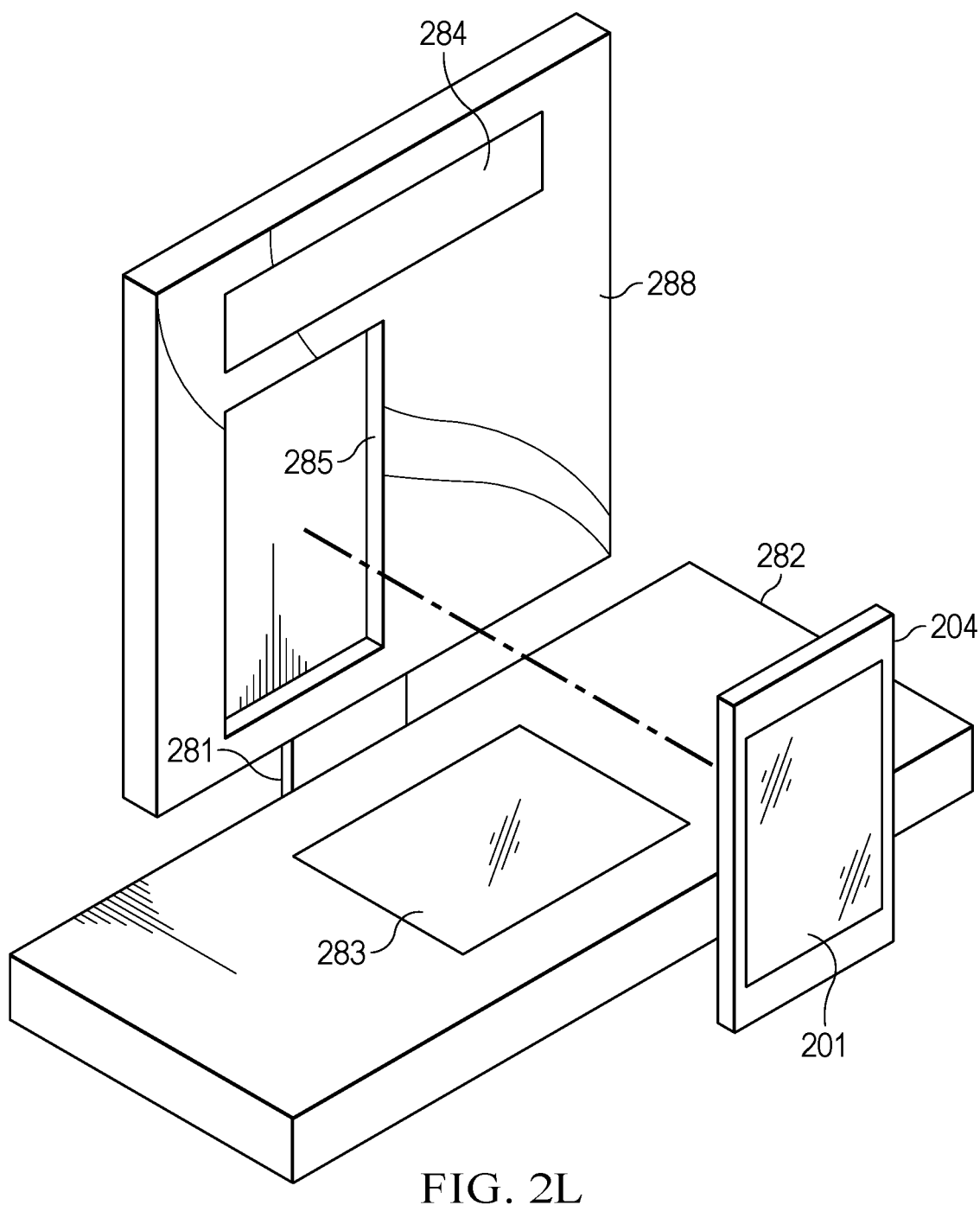
FIG. 2L is an exploded view of preferred embodiment of a modular display device.

Referring to FIG. 2L, another preferred embodiment will be described. Substrate 288 is fixed to back support 281. Back support 281 is fixed to automated checkout console 282 adjacent label scanner 283. Substrate 288 supports pixelated display 284. Pixelated display 284 is operatively connected to label scanner 283. Substrate 288 includes recess 285. Electronic display module 204 is removably fixed in recess 285. In this embodiment, the substrate forms an integrated containment case for the automated checkout console.

Figure 3:
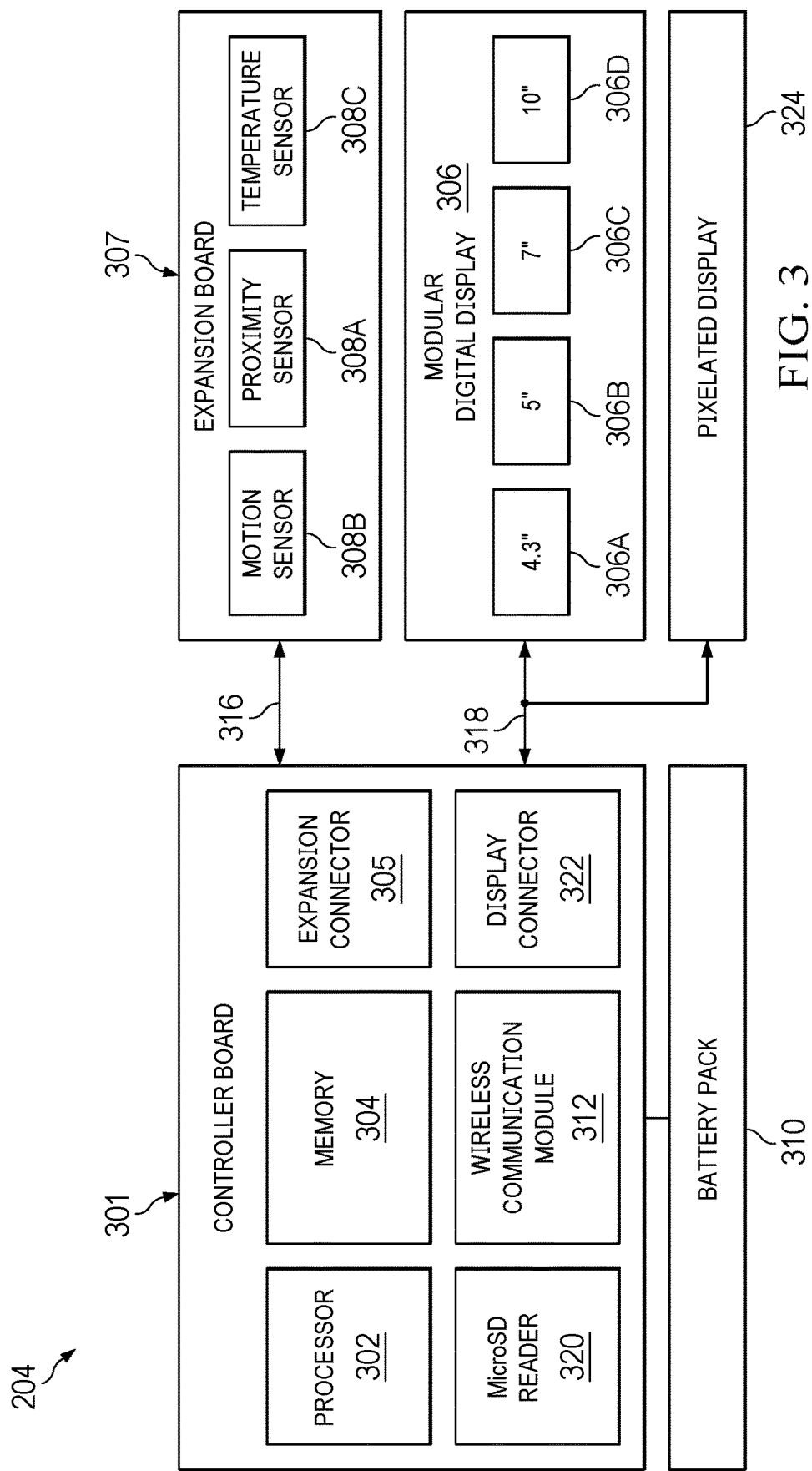
FIG. 3 is a preferred hardware architecture diagram of a preferred display module.

Referring to FIG. 3, a preferred hardware architecture of electronic display module 204 will be further described. Electronic display module 204 comprises controller board 301, operatively connected to expansion board 307, modular digital display 306 and (optionally) pixelated display 324. Processor 302 is further operatively connected to expansion connector 305 and display connector 322. Expansion connector 305 is connected to expansion board 307 by ribbon cable 316. Display connector 322 is connected to modular digital display 306 and pixelated display 324 by RIBUS connector cable 318, as will be further described.

Controller board 301 further comprises processor 302 operatively connected to memory 304 and microSD reader 320. Memory 304 may include video or audio content, as will be further described. MicroSD reader 320 is a memory card device for accessing data on a memory card (not shown) such as a compact flash, secure digital, or multimedia card. The memory card also can store instructions for processor 302, if need be.

Processor 302 is further operatively connected to wireless communication module 312, as will be further described. Wireless communication module 312 is typically in radio communication with data collector 114, data collector 116, and/or data collector 118.

Controller board 301 is powered by battery pack 310. Battery pack 310 is in operative connection with processor 302, memory 304, microSD reader 320 and wireless communication module 312.

Expansion board 307 further comprises short range proximity sensor 308A, long range motion sensor 308B, and temperature sensor 308C, as will be further described.

Modular digital display 306 further comprises one of digital display 306A, digital display 306B, digital display 306C, and/or digital display 306D, as will be further described.

In a preferred embodiment, battery pack 310 is carefully chosen and matched to one of digital display 306A, 306B, 306C, and/or 306D. Preferably, digital display 306A is a 4.3 inch unit, part number RVT43HLBNWN00, digital display 306B is a 5 inch unit, part number RVT50HQBNWN00, digital display 306C is a 7 inch unit, part number RVT50HQBNWN00, and digital display 306D is a 10.1 inch unit, part number RVT101HVBNWN00, all available from Riverdi Sp. z o.o, of Gdansk, Poland. The display settings for each of digital displays 306A, 306B, 306C, and 306D are modified as described in Table 1 and Table 2, either manually or automatically by the processor, to maximize battery life of battery pack 310 and are not mere design choice. It is estimated that dynamically optimizing the settings of each particular digital display to the type of battery pack and the charge level of the battery pack increases the shelf life of the modular display by 60-80% over conventional technology. By optimizing the display to the battery pack, the modular device has a surprising shelf-life duration of about ninety days.

Further, the processor optimizes the display settings according to a "wait state", a "standby state" and an "active playback state", as will be further described. In the wait state, the device draws power only in the nano-ampere range. In the standby state, the device draws power only in the micro-ampere range. In the active playback state, the device draws power in the milliamp range.

In the case of dry cell D cell batteries, up to 10 batteries may be wired in parallel in the battery pack. A single 10-cell pack delivers about 19,000 mAh. The parallel arrangement also increases display lifetime. Likewise, 10-packs of batteries may be daisy chained together to increase capacity.

For example, 2 10-packs increase capacity to about 380,000 mAh. During discharge of the D cell batteries, the refresh rate and the brightness of the digital display are set according to Table 1. The table reflects the refresh rate display setting as a ratio of the refresh rate setting to the maximum refresh rate available on the preferred displays, and also in terms of percentages of the maximum refresh rate available.

TABLE 1

| Battery Pack | Digital Display Type | Display Modification |
|---|---|---|
| Dry Cell Lithium D Cell Batteries (2 to 10) at 3.6 V each about 19,000 mAh | 306A | Active Refresh Rate 75 Hz/75 Hz (100%) Active Brightness Setting 80% Standby Refresh Rate 30 Hz/75 Hz (40%) Standby Brightness Setting 50% |
| Dry Cell Lithium D Cell Batteries (2 to 10) at 3.6 V each about 19,000 mAh | 306B | Active Refresh Rate 60 Hz/75 Hz (80%) Active Brightness Setting 70% Standby Refresh Rate 25 Hz/75 Hz (33%) Standby Brightness Setting 40% |
| Dry Cell Lithium D Cell Batteries (2 to 10) at 3.6 V each about 19,000 mAh | 306C | Active Refresh Rate 55 Hz/75 Hz (73%) Active Brightness Setting 60% Standby Refresh Rate 25 Hz/75 Hz (33%) Standby Brightness Setting 40% |
| Dry Cell Lithium D Cell Batteries (2 to 10) at 3.6 V each about 19,000 mAh | 306D | Active Refresh Rate 55 Hz/75 Hz (73%) Active Brightness Setting 50% Standby Refresh Rate 25 Hz/75 Hz (33%) Standby Brightness Setting 40% |

In the case of lithium-ion cells, during normal discharge of the battery, the refresh rate and the brightness of the digital display are set, according to Table 2. However, lithium-ion cells at the end of their charge cycle are known to have steep voltage drop. Further, at the end of the discharge cycle a voltage cut-off must be implemented to prevent battery damage. In the cases of the "discharge" and "end-of-discharge" conditions, the system implements settings for the digital display units that override the "active" and "standby" settings that are implemented during normal battery usage as set out in Table 2. Under-volt protection is provided by a switch out circuit at 3.2V to avoid battery damage. Preferably, in the case of lithium ion cells, battery pack 310 is part number ABI-H96B2I85-1S2P-51AH, available from Ascent International Group Co. Ltd. of Hong Kong. The battery pack further incorporates battery management IC, part number BQ28Z610, available from Texas Instruments of Dallas, Texas.

TABLE 2

| Battery Pack | Digital Display Type | Display Modification |
|---|---|---|
| Lithium Ion Cell (I) at 3.7 V about 50,000 mAh | 306A | Active Refresh Rate 75 Hz/75 Hz (100%) Active Brightness Setting 80% Standby Refresh Rate 30 Hz/75 Hz (40%) Standby Brightness Setting 50% Discharge Refresh Rate 50 Hz/75 Hz (66%) Discharge Brightness 22 Hz/75 Hz (30%) End-of-Discharge Refresh Rate 20 Hz/75 Hz (26%) End-of-Discharge Brightness Setting 15% |
| Lithium Ion Cell (I) at 3.7 V about 50,000 mAh | 306B | Active Refresh Rate 60 Hz/75 Hz (80%) Active Brightness Setting 70% Standby Refresh Rate 25 Hz/75 Hz (33%) Standby Brightness Setting 40% Discharge Refresh Rate 50 Hz/75 Hz (66%) Discharge Brightness 22 Hz/75 Hz (30%) End-of-Discharge Refresh Rate 20 Hz/75 Hz (26%) End-of-Discharge Brightness Setting 15% |
| Lithium Ion Cell (I) at 3.7 V about 50,000 mAh | 306C | Active Refresh Rate 55 Hz/75 Hz (73%) Active Brightness Setting 60% Standby Refresh Rate 25 Hz/75 Hz (33%) Standby Brightness Setting 40% Discharge Refresh Rate 40 Hz/75 Hz (53%) Discharge Brightness 15 Hz/75 Hz (20%) End-of-Discharge Refresh Rate 15 Hz/75 Hz (20%) End-of-Discharge Brightness Setting 10% |
| Lithium Ion Cell (I) at 3.7 V about 50,000 mAh | 306D | Active Refresh Rate 55 Hz/75 Hz (73%) Active Brightness Setting 50% Standby Refresh Rate 25 Hz/75 Hz (33%) Standby Brightness Setting 40% Discharge Refresh Rate 30 Hz/75 Hz (40%) Discharge Brightness 15 Hz/75 Hz (20%) End-of-Discharge Refresh Rate 10 Hz/75 Hz (13%) End-of-Discharge Brightness Setting 10% |

Each of short range proximity sensor 308A, long range motion sensor 308B, and temperature sensor 308C is individually addressable by processor 302, as will be further described. In other embodiments, multiple proximity sensors and/or motion sensors may be utilized and are connected to the processor in daisy chain fashion or can be individually addressable.

Short range proximity sensor 308A further comprises a laser range finder incorporating physical infrared filters to achieve optimum performance and various ambient lighting conditions. Short range proximity sensor 308A typically provides a return signal at about 3 meters to target. Short range proximity sensor 308A is preferably the Lightranger 8 Click, ranging sensor, which includes multi target detection, part number MIKROE-4492, available from MikroElektronika of Belgrade, Serbia. The preferred proximity sensor also provides an increasing voltage signal as a greater number of targets is recognized. This increasing voltage signal can be interpreted as a number of targets present in front of the display unit, and is returned as a sensor metric, as will be further described.

Preferably, long range motion sensor 308B is the Motion 4 Click, part number MIKROE-4078, available from MikroElectronika. Alternatively, long range motion sensor 308B includes part number EKMC1603111 available from Digi-Key and adapted to be used as a human motion detector with sensitivity up to 12 meters at a minimum 170 µA power consumption. Long range motion sensor 308B typically provides a return signal at about 30 meters to target, at a larger power consumption.

Preferably, temperature sensor 308C is part number MAX31855K available from MikroElectronika. Temperature sensor 308C provides thermo couple to digital converter and is connected to the expansion board via an SPI, read-only interface. Further, temperature sensor 308C includes a range between about −400° C. and about 900° ° C. with a sensitivity of about 41 µV over 1° F. Temperature sensor 308C further includes a K type thermal couple probe also available from MikroElectronika.

Figure 4A:
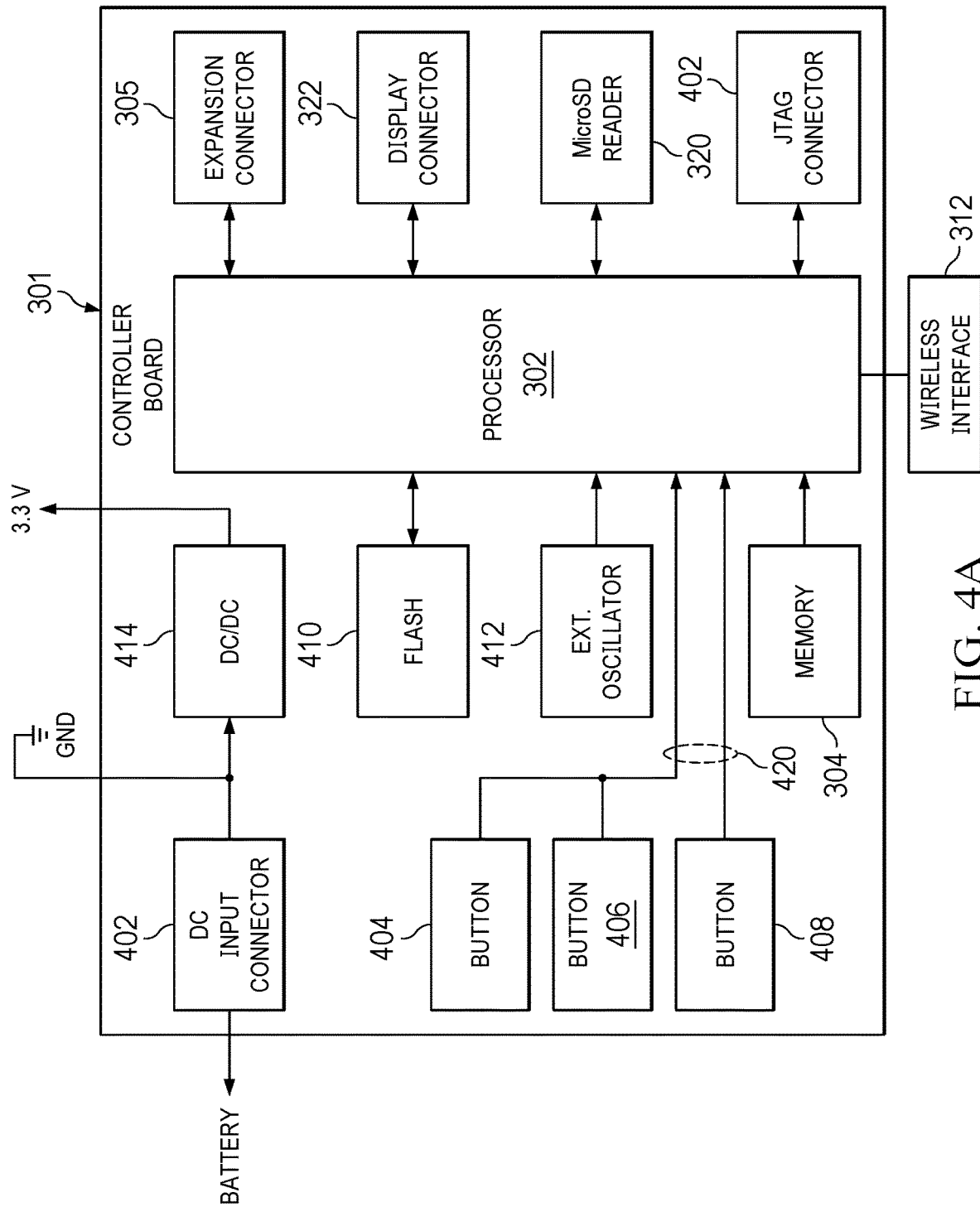
FIG. 4A is a preferred hardware architecture diagram of a preferred controller board.
Figure 4B:
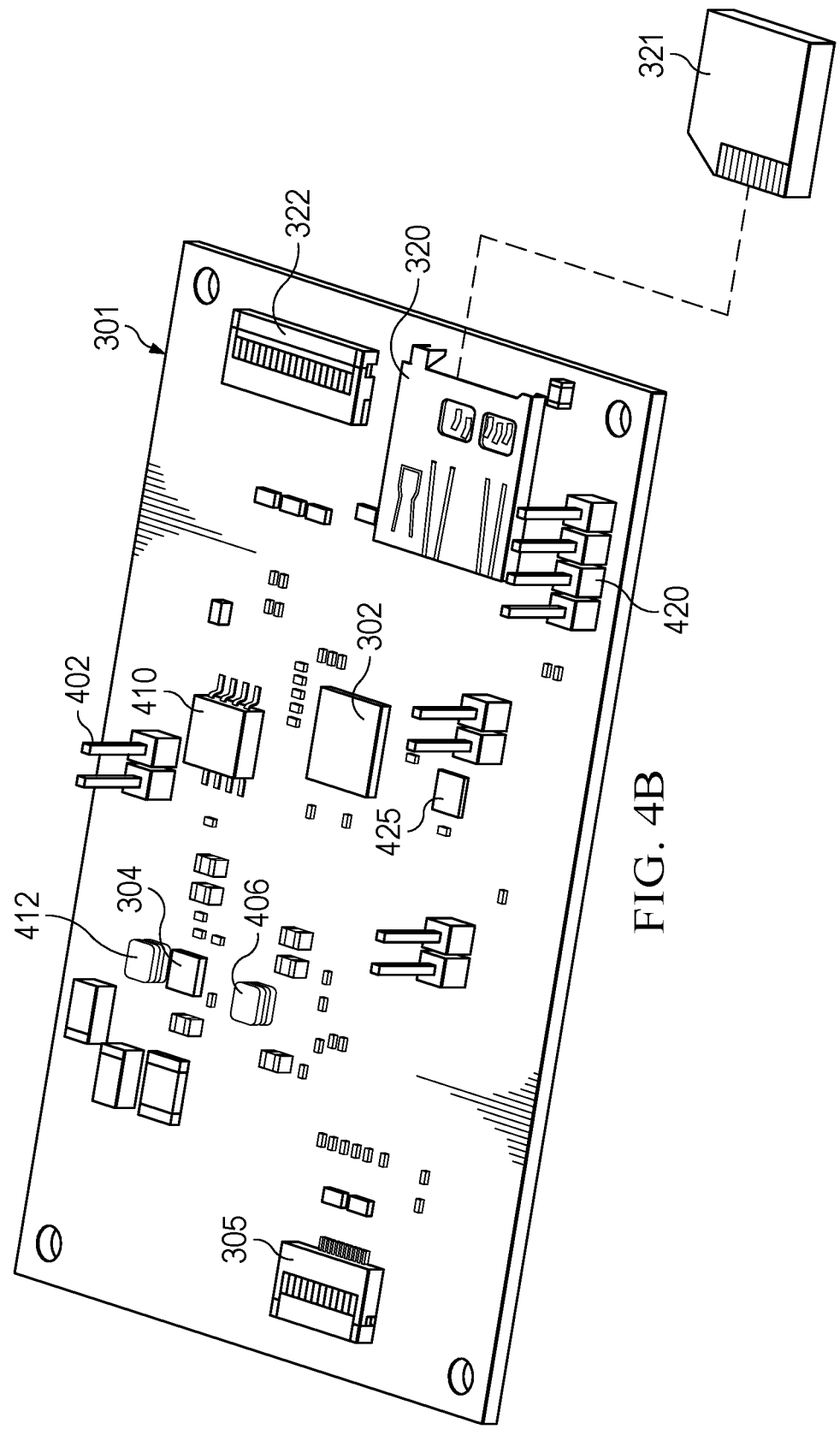
FIG. 4B is an isometric view of a preferred controller board.

Referring to FIGS. 4A and 4B, a preferred embodiment of controller board 301, as will be further described.

Processor 302 is preferably a Raspberry Pi Pico, part number RP2040 W micro controller, available from Digi-Key. The processor includes a dual core, ARM cortex-MO processor including 256K RAM with 30 GPIO pin. Flash memory 410 is included in the processor and is preferably a 2 MB onboard QSPI flash memory which is used for code and data storage. The processor provides eight state machines. In another embodiment, the processor preferably is product code KW-3017, EAN 5056561803173 available from Kiwi Electronics B.V. of Den Haag, The Netherlands. In another embodiment, processor 302 is preferably the RP 2040-QFN-56 Package Microcontroller by Raspberry PI available from Sharvi Technologies (OPC) of Karnataka, India.

Wireless communication module 312 preferably is the 2.4 GHz wireless interface provided by part number CYW43439 available from Infineon Technologies AG of Neubiberg, Germany and connected to the processor via SPI. In another preferred embodiment, wireless communication module 312 is part number MRF24WN0MA-I/RM100-ND, WiFi 802.11b/g/n Transceiver Module available from Digi-Key Electronics of Thief River Falls, Minnesota.

Expansion connector 305 is connected to the processor which provides a 12 bit 500 Ksps analog to digital converter for communication with expansion board 307 with the proximity sensor, motion sensor and temperature sensor The processor is driven by external oscillator 412 at approximately 24 to 133 MHz clock frequency. During each wait state, the processor is driven at approximately the lowest frequency of the oscillator, 24 MHz. Alternatively, the processor is driven at approximately the highest frequency of the oscillator, 133 MHz. External oscillator 412 preferably is a crystal resonator available under part number 24.00M-SMDXT324 YIC available from TME Group of Łódź, Poland.

The processor supports two UARTS which are operatively connected to connector 402 for J-tag supervision. Preferably, flash memory 410 is operatively connected to the processor and is used to store programming instructions. Preferably, flash memory 410 is a low power 3V package including 128 Mb, with 4 KB uniform sectors. Flash memory 410 is preferably part number W25Q128JWSIQ available from Digi-Key. In this embodiment, the flash memory stores boot instructions for the processor.

Test power for the controller board is provided by DC-DC converter 414. DC-DC converter 414 is a power management IC, part number ISL9120IRN-EZV available from Digi-Key, which is used for evaluation and testing and provides conversion from 1.8V to 5.5V to 3.3V output. DC-DC converter 414 is further comprised of voltage regulator 425. Voltage regulator 425 is preferably a buck boost circuit provided by Texas Instruments of Dallas, Texas under part number TPS63001. The DC-DC converter is typically disconnected in favor of the battery pack upon deployment of the display. Alternatively, the DC-DC converter may be used to recharge the batteries.

Button 404, button 406, and button 408 are connected to the processor via onboard connector 420 and provide functions of programming and resets, as will be further described. SD card 321 is removable and connected to microSD reader 320. It includes video and audio display files and program instructions for the processor.

Preferably, the digital display (not shown), is physically attached by standoffs to the controller board, and the expansion cards (not shown) and the battery pack (not shown) are enclosed in a sealed Bakelite container (not shown) and fixed in epoxy, thereby creating a durable and reusable structure which may be fixed in the various recesses of the support structures and face frames of the invention.

Figure 5A:
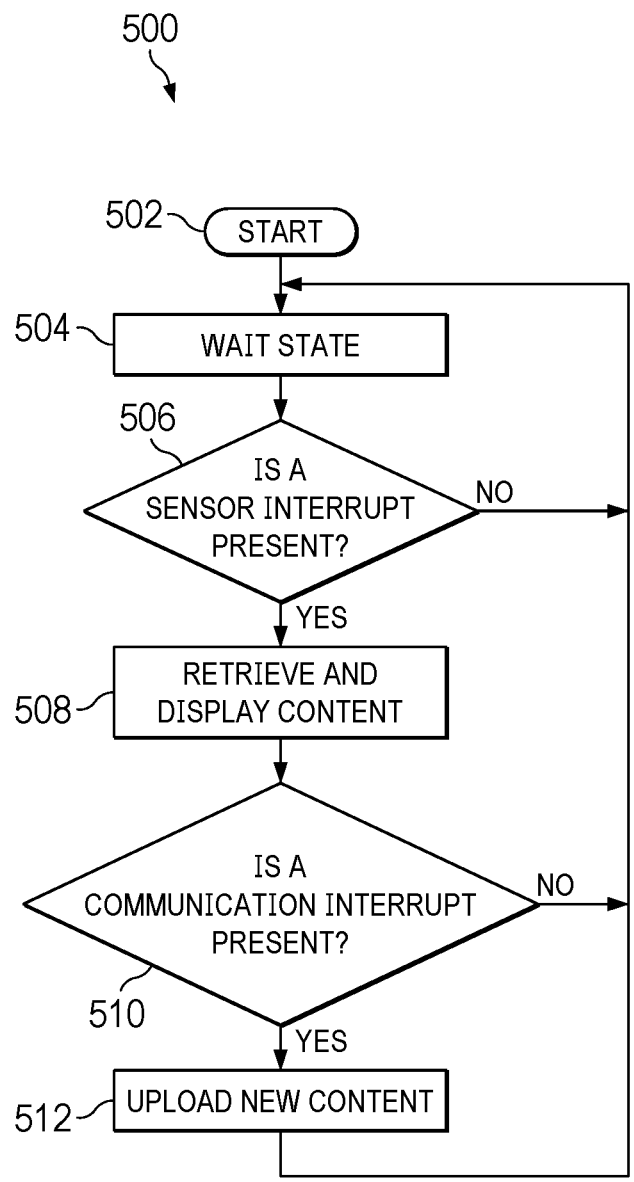
FIG. 5A is a flow chart of a preferred method of operation of the device.

Referring to FIG. 5A, preferred method 500 of operation of the device will be described.

At step 502, the method begins. At step 504, the processor enters a wait state, which reduces clock speed and deactivates all processor functions except for monitoring an interrupt channel.

At step 506, the processor monitors the interrupt channel for the presence of a signal from one or more of the sensors. If no signal is present, the processor returns to wait state 504. If a signal is present, the processor moves to step 508.

At step 508, the processor increases clock speed and retrieves the current content from the memory and displays it on the display.

At step 510, the processor monitors the communications interface for a communication interrupt signal. If a communication interrupt signal is present, the processor moves to step 512. If not, the processor returns to wait state 504.

At step 512, new content is uploaded from the communications module and used to replace the old content in the memory. Once new content is uploaded, the processor returns to wait state 504.

Figure 5B:
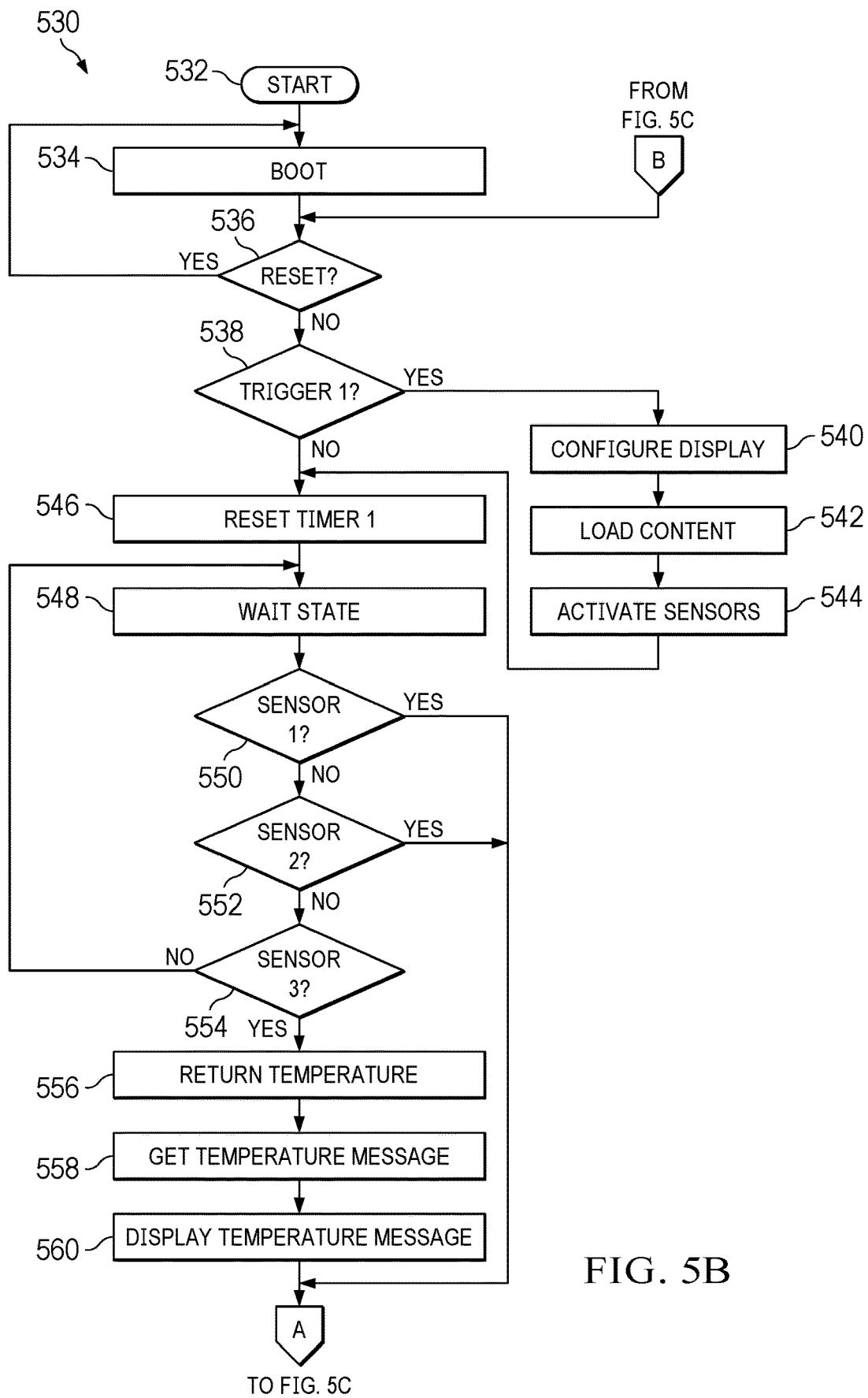
FIGS. 5B and 5C is a flow chart of a preferred method of operation of the device.
Figure 5C:
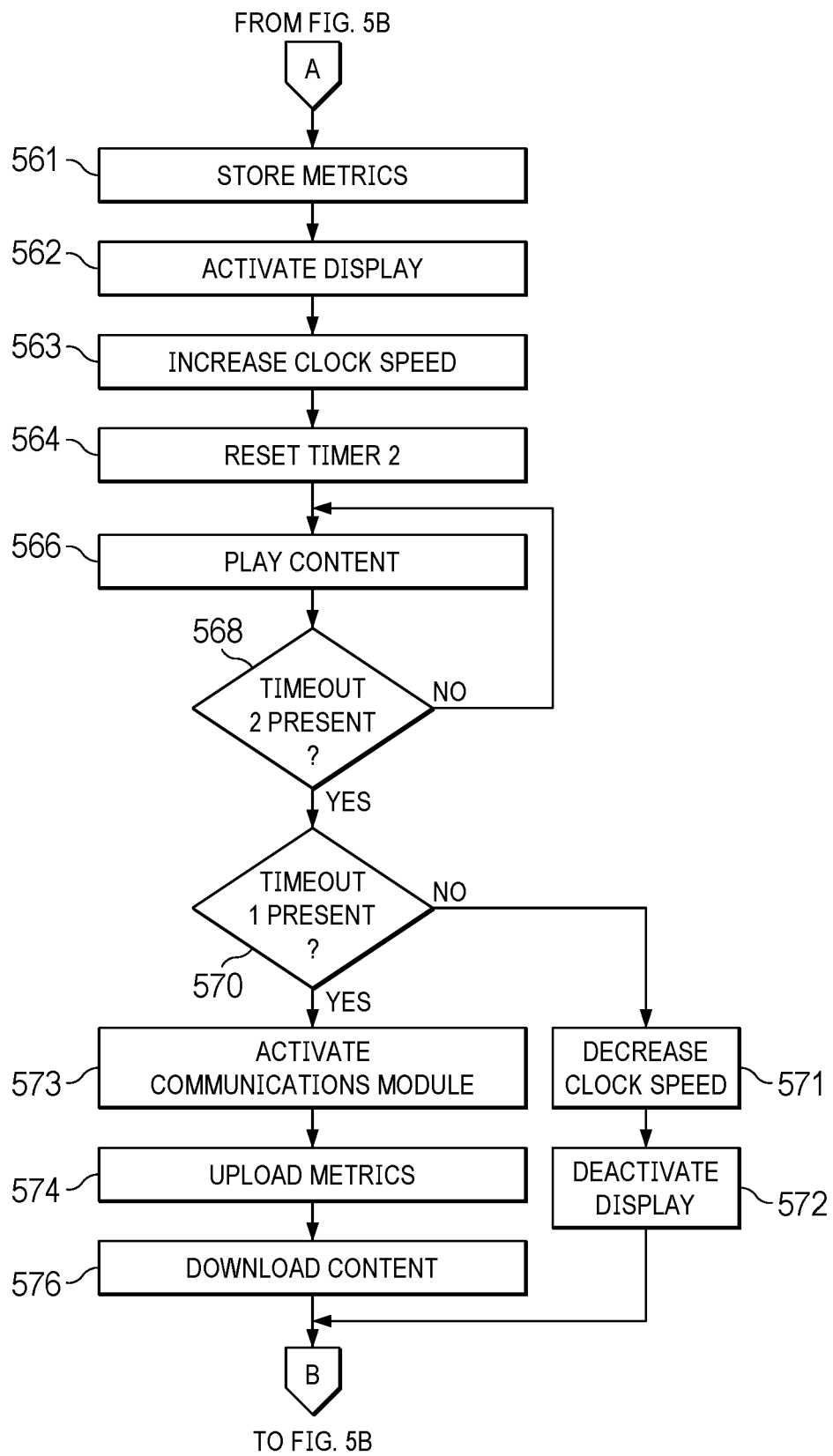

Referring then to FIGS. 5B and 5C, an alternate preferred method 530 of operation of the device will be further described.

At step 532, the method begins.

At step 534, the processor boots from local memory and sets the clock speed at the minimum tolerated by the processor or available from the oscillator, whichever is less.

At step 536, the processors polls button 404 for a reset condition. If a reset condition is present, the processor returns to step 534. If not, the processor moves to step 538.

At step 538, the processor polls button 406 for a trigger condition. If a trigger condition is present, the processor moves to step 540. If the trigger condition is not present, the processor moves to step 546.

At step 540, the processor configures modular digital display 306. To configure the display, the processor polls button 408 for one of five code conditions corresponding with one or more of digital displays 306A, 306B, 306C, and 306D and pixelated display 324. The result is stored in memory.

At step 542, the processor loads content from the memory card in microSD reader 320.

At step 544, one or more of the proximity sensor, the motion sensor and/or the temperature sensor are activated. The processor then moves to step 546.

At step 546, the processor resets a first timer.

At step 548, the processor enters a wait state. In the wait state, clock speed is reduced to the minimum available from the oscillator or the minimum tolerated by the processor to continue running (i.e. not zero). The digital display is set to the "inactive" state, as will be further described. During wait state 548, the processor executes steps 550, 552 and 554.

At step 550, processor polls the proximity sensor. If no signal is present, the processor moves to step 552. If a signal is present, the processor moves to step 562.

At step 552, the processor polls the proximity sensor. If a signal is present, the processor moves to step 562. If not, the processor moves to step 554.

At step 554, the processor polls the temperature sensor. If a signal is present, the processor moves to step 556. If not, the processor returns to wait state 548. If no temperature sensor is connected, no signal is returned.

At step 556, temperature sensor 308C returns to temperature from the temperature probe.

At step 558, while still running at low clock frequency, the processor fetches a temperature message based on a temperature range. In a preferred embodiment, the message temperature range is between 0° F. and 35° F. A first message is provided if the range is about 35° F. to 70° F., a second message is fetched. If the temperature range is between 70°F and 100° F., a third temperature message is retrieved from memory.

At step 560, the temperature message is displayed on the pixelated display.

At step 561, the processor stores sensor metrics in memory. In a preferred embodiment, the metrics are stored in a table organized by date and time. The sensor metrics for the proximity sensor, can include a single byte numerical value of distance in feet and a single byte for the numerical number of targets, for the motion sensor, a single bit binary value interpreted as human "present" or "not present", and a single byte numerical temperature value in ° F.

At step 562, the digital display is set to the "active" state, as will be further described.

At step 563, the processor increases clock speed to the maximum provided by the oscillator or the maximum tolerated by the processor.

At step 564, the processor resets a second timer and/or the digital display.

At step 566, the processor fetches content from memory and displays it on the digital display and/or the pixelated display.

At step 568, the processor determines whether or not the second timer has reached a maximum preset limit. In one embodiment, the maximum preset limit is between about 30 seconds and 2 minutes. Other preset limits may be used. If so, the processor moves to step 570. If not, the processor returns to step 566.

At step 570, the processor determines whether or not the first timer has reached a maximum preset limit. In one embodiment, the maximum preset limit is between about 2 hours and about 24 hours. Other preset limits may be used. If not, the processor moves to step 571. If so, the processor moves to step 572.

At step 571, the processor reduces clock speed to the minimum provided by the oscillator or allowed by the processor.

At step 572, the display is set to its "inactive state". The method then returns to step 536.

At step 573, wireless communication module 312 is activated.

At step 574, the metrics stored in memory are sent to the communications module for communication to one or more of data collectors 114, 116 or 118. The data collectors then upload the metrics to the server through the internet, where they are stored in the database. The metrics can then be accessed by the administrator device and/or the user devices.

At step 576, video and/or audio content and processor instructions are downloaded by the communications module from one or more of data collectors 114, 116 or 118. The new content file can either replace or supplement the content already stored in memory and will be accessed and played by the processor. In one embodiment, the audio and/or video content and/or processor instructions are downloaded from the administrator device to the server, which then downloads them to the data collectors. In this way, the timing and frequency of the file update in the display device memory is controlled by the server. The method then returns to step 536.

Figure 6A:
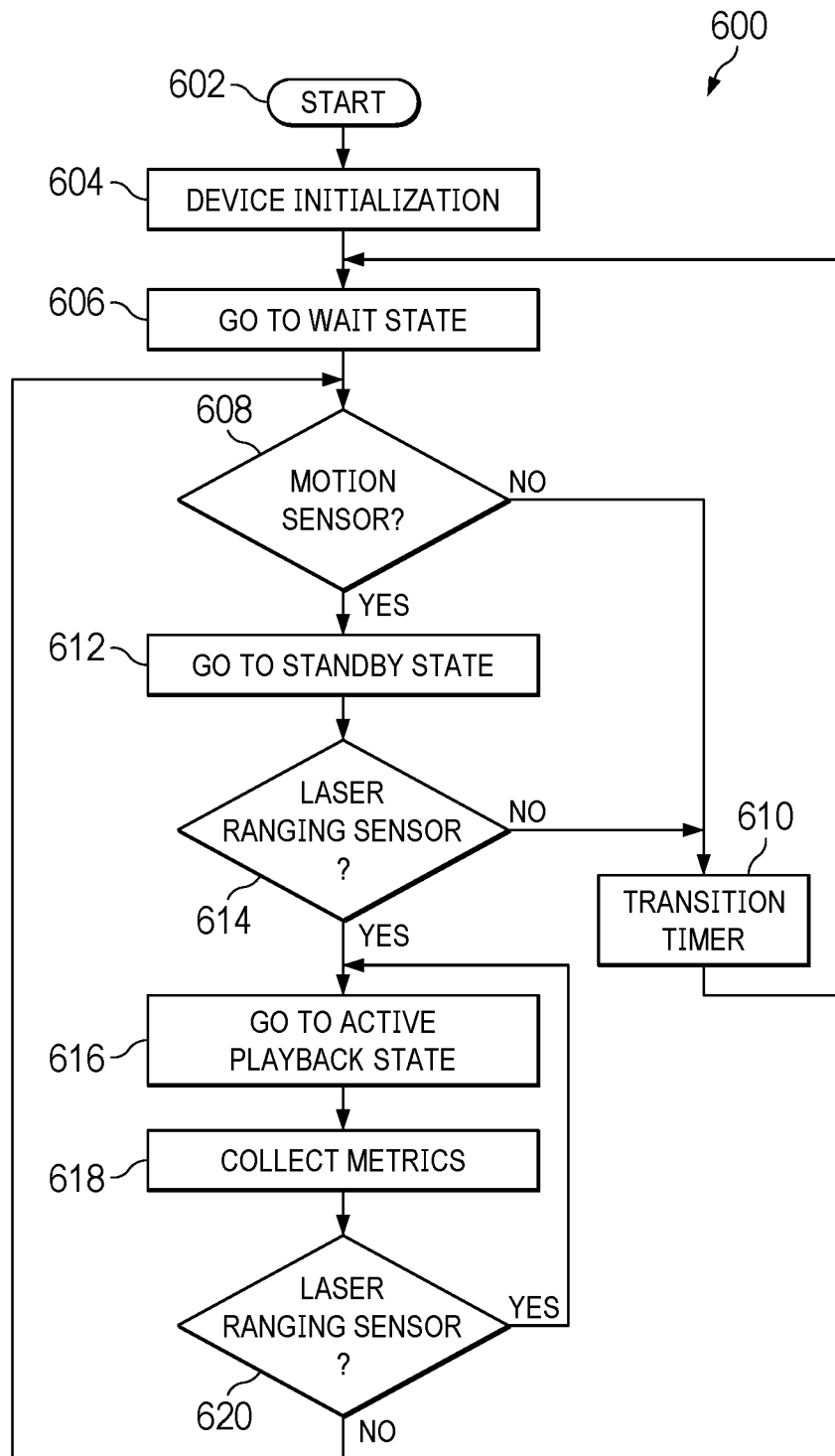
FIGS. 6A, 6B, 6C and 6D are flow charts of a preferred method operation of the device.

Referring then to FIG. 6A, method of operation 600, will be further described.

At step 602, the method begins.

At step 604, the processor initializes the device. Preferably, the processor boots from local memory, and all peripheral devices are checked for errors. If errors are found, the device initialization fails and the method concludes. If not, the method moves to step 606.

In step 606, the device transitions to a wait state, as will be further described.

At step 608, the processor determines whether or not the motion sensor has detected movement. If so, the method moves to step 612. If not, the method moves to step 610.

At step 610, the processor waits a certain predetermined of time before returning to step 606. Preferably, the transition time is set from about 3 to about 10 seconds.

At step 612, the processor moves the system to a standby state, as will be further described.

At step 614, if the laser ranging sensor detects motion, then the processor moves to step 616. If not, the processor returns to step 610.

At step 618, metrics are collected from the motion sensor and the laser ranging sensor, as previously described.

At step 620, the proximity sensor is again polled by the processor to determine whether or not a target is present. If so, the processor returns to step 616. If not, the processor returns to step 608.

At step 616, the processor moves to an active playback state, as will be further described.

Figure 6B:
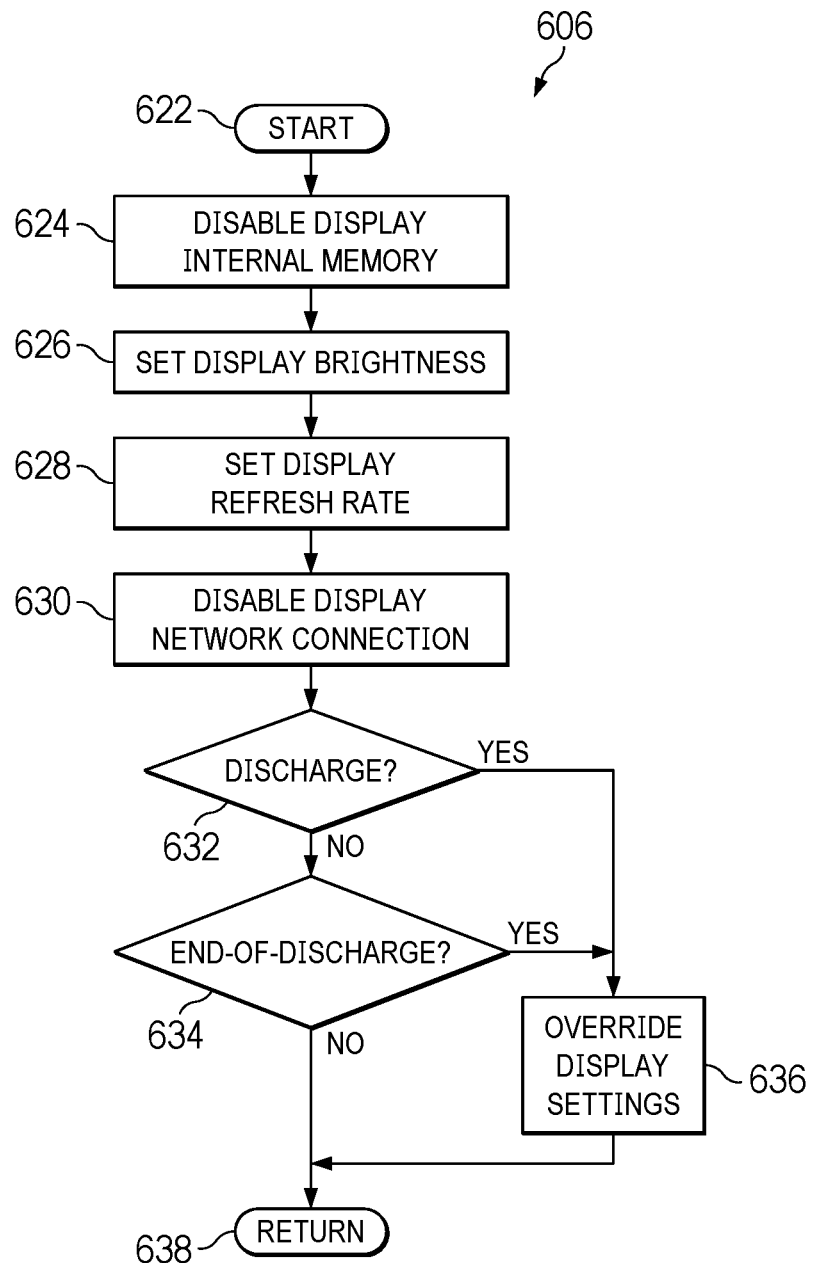

Referring then to FIG. 6B, the wait state of step 606 will be further described.

At step 622, the method begins.

At step 624, the processor disables the internal memory of the display.

At step 626, the processor sets the brightness of the display to zero.

At step 628, the processor sets the refresh rate of the display to zero.

At step 630, the processor optionally disables the display network connections, including the network connection of the display itself.

In another embodiment, the remote content management system can provide deployment of content from multiple advertisers.

At step 632, the processor determines whether or not a discharge state is present in the battery pack. If so, the processor moves to step 636. If not, the processor moves to step 634.

At step 636, the processor uses the setting of Table 2, according to the display connected, to override the active or standby display settings and replace them with the discharge setting in the table. The method then moves to step 638.

At step 634, the processor determines whether or not an end-of-discharge state is present in the battery pack. If so, the method moves to step 636. If not, the method moves to step 638. The display setting once overridden, are locked until the unit is deactivated.

At step 638, the method returns.

Figure 6C:
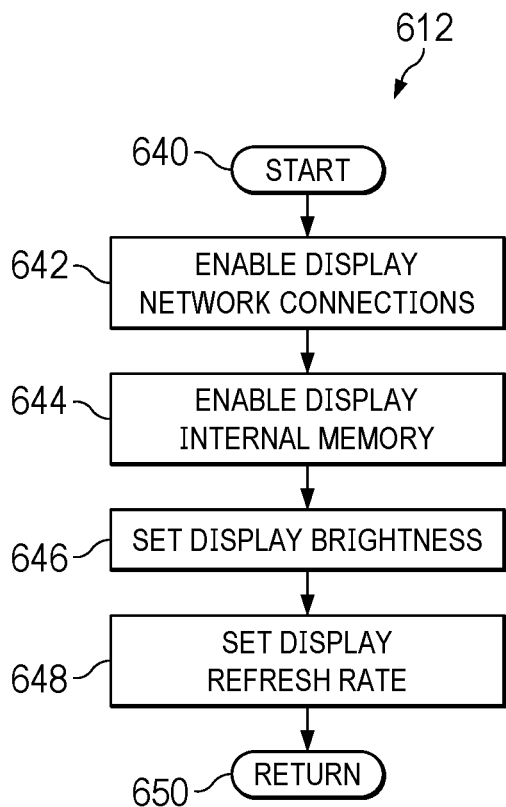

Referring then to FIG. 6C, the standby state of step 612 will be further described.

At step 640, the method begins.

At step 642, the processor enables the display network connections, including the internal display network connection.

At step 644, the processor enables the display internal memory.

At step 646, the processor sets the display brightness according to Tables 1 or 2, depending on the battery pack present. If the battery pack is in either a discharge or end-of-discharge condition, then the display brightness for this condition is used to override the standby settings.

At step 648, the processor sets the display refresh rate according to Tables 1 or 2, depending on the battery pack present. If the battery pack is in either a discharge or end-of-discharge condition then the display refresh rate for this condition is used to override the standby settings.

At step 650, the method returns.

Figure 6D:
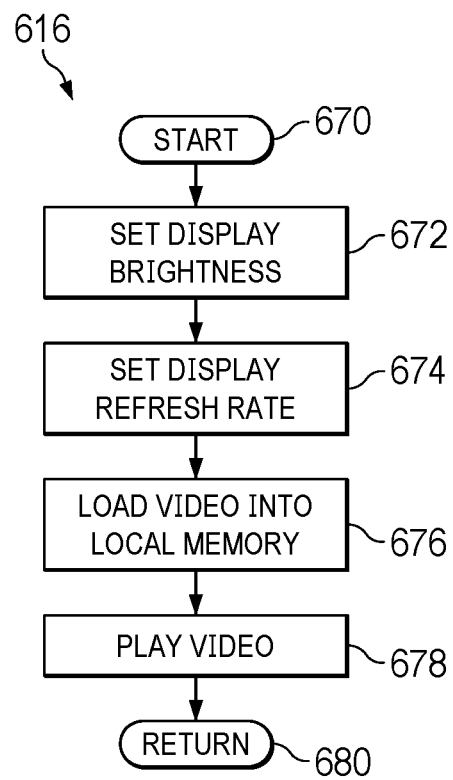

Referring then to FIG. 6D, the active playback state of step 616 will be further described.

At step 670, the method begins.

At step 672, the processor sets the display brightness according to Tables 1 or 2, depending on the battery pack present. If the battery pack is in either a discharge or end-of-discharge condition, then the display brightness for this condition is used to override the standby settings.

At step 674, the processor sets the display refresh rate according to Tables 1 or 2, depending on the battery pack present. If the battery pack is in either a discharge or end-of-discharge condition then the display refresh rate for this condition is used to override the standby settings.

At step 676, the processor loads the video data file into local memory.

At step 678, the processor plays the video file on the display.

At step 680, the method returns.

Figure 7A:
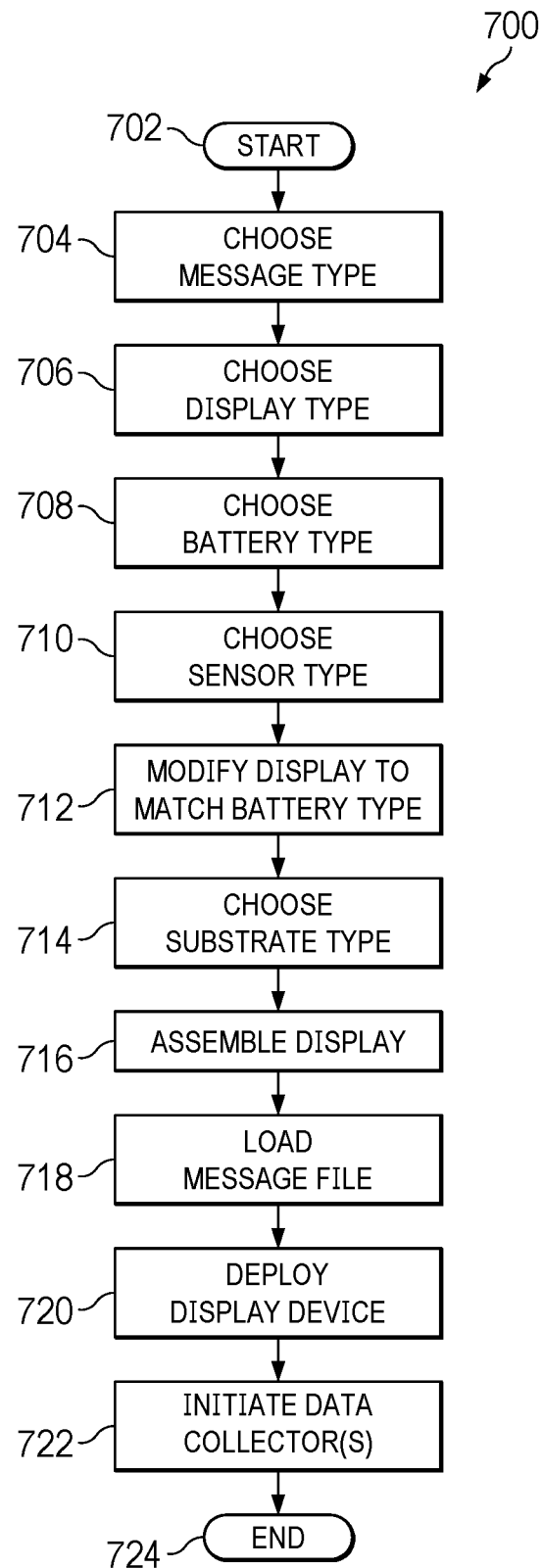
FIG. 7A is a flow chart of a preferred method of assembly and deployment of a preferred display device.

Referring then to FIG. 7A, method of display assembly 700 will be further described.

At step 702, the method begins.

At step 704, a message type is chosen. In this step, content is chosen between text display for the pixelated display, video data and/or audio for the digital display screen.

At step 706, a screen type is chosen. The screen type is chosen to match the size requirements of the campaign and/or the message data type. Preferably, the display type is chosen from those identified in Tables 1 and 2.

At step 708, a battery type is chosen to accommodate the screen type chosen in step 706. Preferably, the battery type is chosen from those identified in Tables 1 and 2.

At step 710, a sensor type is chosen. Preferably, the sensor type is chosen to accommodate the message type chosen in step 704.

At step 712, the display is electrically modified to match the battery type. Preferably, the display modifications described in Tables 1 and 2 are implemented to each chosen display, as previously described. In another embodiment, the display settings are stored in local memory of the processor for later use by the processor in modifying the display settings automatically.

At step 714, a substrate type is chosen. Preferably, the substrate chosen includes at least one of those depicted in FIGS. 2B-2K.

At step 716, the display module is incorporated into the substrate and the appropriate surrounding frame, if applicable.

At step 718, the chosen message file is loaded into removable memory such as an SD card, as previously described.

At step 720, the assembled display is deployed at the retail location and initialized.

At step 722, the data collectors, if present, are initialized. Preferably, server 104 identifies and pings each data collector which then establishes a dedicated communication channel. Preferably the server tracks the number and serialized identity of each display device so that content can be individually addressed to each device, and so that metrics from each device can be stored in a table categorized by device serial number.

At step 724, the method concludes.

Figure 7B:
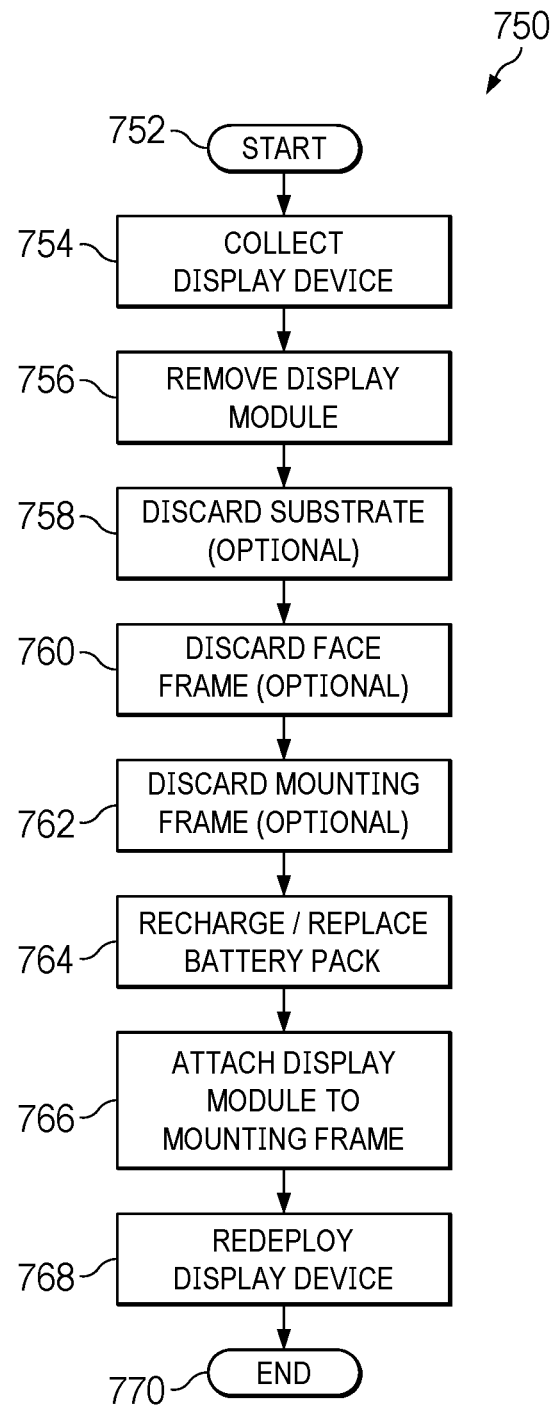
FIG. 7B is a flow chart of a preferred method of disassembly and reuse of a preferred embodiment.

Referring to FIG. 7B, preferred method of disassembly 750 and reuse of a preferred display device will be further described.

At step 752, the method begins.

At step 754, the display device physically is collected from the retail location.

At step 756, the display module is removed from the substrate, face frame and or mounting frame.

At step 758, the substrate is optionally discarded.

At step 760, the face frame is optionally discarded.

At step 762, the mounting frame is optionally discarded.

At step 764, the battery pack is either recharged, in the case of lithium-ion batteries, or replaced, in the case of dry cell D cells.

At step 766, the display module is reattached to a mounting frame, base frame, and/or substrate, as previously described.

At step 768, that display devices redeployed and initialized, as previously described.

At step 770, the method concludes.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

The invention claimed is:

1. A display system comprising:
a mounting frame;
a modular controller removably supported by the mounting frame;
a battery, of a set of batteries, operatively connected to the modular controller;
a display, of a set of displays, operatively connected to the modular controller, and electronically optimized to the battery, for extending battery life; and
wherein the modular controller further comprises:
a processor operatively connected to a memory; and
a sensor stack operatively connected to the processor;

wherein the memory includes instructions that when executed cause the processor to:
enter a low power wait state in which the display is set to a first power usage setting and a processor clock speed is reduced;
enter a high power active state in which the display is set to a second power usage setting and the processor clock speed is increased, when a signal is received from the sensor stack;
retrieve a first content file from the memory;
display the first content file on the display until expiration of a first timeout condition;
retrieve a battery status from the battery in one of a discharge state and an end of discharge state;
wherein during the discharge state, the battery exhibits a first voltage drop rate;
wherein during the end of discharge state, the battery exhibits a second voltage drop rate;
wherein the second voltage drop rate is greater than the first voltage drop rate;
override the low power wait state and the high power active state upon the battery status reporting the discharge state and reset the display to a third power usage setting;
override the low power wait state and the high power active state upon the battery status reporting the end of discharge state and reset the display to a fourth power usage setting; and
locking the display in one of the third power usage setting and the fourth power usage setting until the processor is deactivated.

2. The display system of claim 1, wherein the mounting frame further comprises:
a face frame; and
a window in the face frame;
wherein the display is positioned adjacent to and visible through the window.

3. The display system of claim 2, wherein the mounting frame further comprises:
a support substrate adjacent the modular controller and fixed to the face frame.

4. The display system of claim 3, further comprising:
a refrigerated compartment attached to the mounting frame;
a forward looking proximity sensor, mounted in the face frame, directed away from the refrigerated compartment; and
a rearward looking temperature sensor, mounted in the support substrate, sensing a temperature of the refrigerated compartment;
wherein the forward looking proximity sensor and the rearward looking temperature sensor are operatively connected to the modular controller.

5. The display system of claim 3, wherein the face frame further comprises:
a first sensor operatively connected to the modular controller.

6. The display system of claim 5, wherein the support substrate further comprises:
a second sensor operatively connected to the modular controller.

7. The display system of claim 6, wherein the first sensor is one of a group of a proximity sensor and a motion sensor and the second sensor is a temperature sensor.

8. The display system of claim 2, wherein the face frame further comprises:
a pixelated display, operatively connected to the modular controller.

9. The display system of claim 1, wherein the set of displays further comprises:
a first panel set to a first refresh rate and a first brightness;
a second panel set to a second refresh rate and a second brightness;
a third panel set to a third refresh rate and a third brightness; and
a fourth panel set to a fourth refresh rate and a fourth brightness.

10. The display system of claim 9, wherein:
the first refresh rate is about 100% and the first brightness is about 80% when the display system is in an active state;
the second refresh rate is about 80% and the second brightness is about 70% when the display system is in the active state;
the third refresh rate is about 73% and the third brightness is about 60% when the display system is in the active state; and
the fourth refresh rate is about 73% and the fourth brightness is about 50% when the display system is in the active state.

11. The display system of claim 9, wherein:
the first refresh rate is about 40% and the first brightness is about 50% when the display system is in a standby state;
the second refresh rate is about 33% and the second brightness is about 40% when the display system is in the standby state;
the third refresh rate is about 33% and the third brightness is about 40% when the display system is in the standby state; and
the fourth refresh rate is about 33% and the fourth brightness is about 40% when the display system is in the standby state.

12. The display system of claim 9, wherein:
the first refresh rate is about 66% and the first brightness is about 30% when the display system is in the discharge state;
the second refresh rate is about 66% and the second brightness is about 30% when the display system is in the discharge state;
the third refresh rate is about 53% and the third brightness is about 20% when the display system is in the discharge state; and
the fourth refresh rate is about 40% and the fourth brightness is about 20% when the display system is in the discharge state.

13. The display system of claim 9, wherein:
the first refresh rate is about 26% and the first brightness is about 15% when the display system is in the end of discharge state;
the second refresh rate is about 26% and the second brightness is about 15% when the display system is in the end of discharge state;
the third refresh rate is about 20% and the third brightness is about 10% when the display system is in the end of discharge state; and
the fourth refresh rate is about 20% and the fourth brightness is about 10% when the display system is in the end of discharge state.

14. The display system of claim 1, wherein the sensor stack further comprises:
at least one of a group of a proximity sensor, a motion detector and a temperature sensor.

15. The display system of claim 4, wherein the memory further comprises instructions that when executed cause the processor to:
retrieve a first message from the memory if the signal indicates a temperature in the refrigerated compartment external to the display system is between about 0° F. and about 35° F.;
retrieve a second message from the memory if the signal indicates the temperature in the refrigerated compartment is between about 35° F. and about 75° F.;
retrieve a third message from the memory if the signal indicates the temperature in the refrigerated compartment is between about 75° F. and about 100° F.; and
show one of a group of the first message, the second message and the third message on the display.

16. The display system of claim 1, wherein the modular controller further comprises:
a communications module operatively connected to the processor; and
the memory further comprises instructions that when executed cause the processor to:
store a set of sensor metrics, related to the sensor stack, in the memory; and
send the set of sensor metrics to the communications module upon expiration of a second timeout condition.

17. The display system of claim 16, wherein the memory further comprises instructions that when executed cause the processor to:
retrieve a second content file from the communications module upon expiration of the second timeout condition; and
display the second content file on the display.

18. A display system comprising:
a reusable electronic controller powered by a battery of a set of batteries;
a support substrate, holding the reusable electronic controller;
a forward facing display, of a set of forward facing displays, physically secured to the reusable electronic controller and optimized for low power use with the battery;
a disposable face frame, having a window, removably coupled to the support substrate, adjacent the reusable electronic controller and positioned so that the forward facing display is visible through the window; and
wherein the reusable electronic controller further comprises:
a processor operatively connected to a memory; and
a sensor stack operatively connected to the processor;
wherein the memory includes instructions that when executed cause the processor to:
enter a low power wait state in which the forward facing display is set to a first power usage setting and a processor clock speed is reduced;
enter a high power active state in which the forward facing display is set to a second power usage setting and the processor clock speed is increased, when a signal is received from the sensor stack;
retrieve a first content file from the memory;
display the first content file on the forward facing display until expiration of a first timeout condition;
retrieve a battery status from the battery in one of a discharge state and an end of discharge state;
override the low power wait state and the high power active state upon the battery status reporting the discharge state and reset the forward facing display to a third power usage setting;
wherein during the discharge state, the battery exhibits a first voltage drop rate;
wherein during the end of discharge state, the battery exhibits a second voltage drop rate;
wherein the second voltage drop rate is greater than the first voltage drop rate;
override the low power wait state and the high power active state upon the battery status reporting the end of discharge state and reset the forward facing display to a fourth power usage setting; and
locking the forward facing display in one of the third power usage setting and the fourth power usage setting until the processor is deactivated.

19. The display system of claim 18, wherein the disposable face frame has a non-uniform perimeter.

20. The display system of claim 18, wherein the window and the disposable face frame are integrally formed and the disposable face frame has an opaque back surface adjacent the window.

21. The display system of claim 20, further comprising:
a sensor mounted in the disposable face frame, operatively connected to the reusable electronic controller, for triggering the display of content stored in a removable memory, upon detection of one of a group of motion and proximity by the sensor.

22. A display system comprising:
a dedicated electronic processor having a memory;
a support substrate holding the dedicated electronic processor;
a digital display, operatively connected to the dedicated electronic processor;
a proximity sensor, operatively connected to the dedicated electronic processor;
a motion sensor, operatively connected to the dedicated electronic processor;
a battery system operatively connected to the dedicated electronic processor, the digital display, the proximity sensor and the motion sensor; and
the memory further comprising instructions that when executed by the dedicated electronic processor cause the display system to:
initialize the dedicated electronic processor;
wait, in a wait state, in which the digital display is set to a first power usage setting, for a first signal from the proximity sensor;
enter a standby state, in which the digital display is set to a second power usage setting, upon receipt of the first signal;
wait, in the standby state, for a second signal from the motion sensor;
enter an active playback state, in which the digital display is set to a third power usage setting, upon receipt of the second signal;
play a content message, stored in the memory, on the digital display during the active playback state;
retrieve a battery status from the battery system in one of a discharge state and an end of discharge state;
override the wait state, the standby state, and the active playback state upon the battery status reporting the discharge state and reset the digital display to a fourth power usage setting;
wherein during the discharge state, the battery exhibits a first voltage drop rate;
wherein during the end of discharge state, the battery exhibits a second voltage drop rate;

wherein the second voltage drop rate is greater than the first voltage drop rate;
override the wait state, the standby state, and the active playback state upon the battery status reporting the end of discharge state and reset the digital display to a fifth power usage setting; and
locking the digital display in one of the fourth power usage setting and the fifth power usage setting until the dedicated electronic processor is deactivated.

23. The display system of claim 22, wherein the memory comprises further instructions that when executed by the dedicated electronic processor cause the display system to:
wait, in the active playback state, for a third signal from the proximity sensor; and
return to the wait state if the third signal is not received.

24. The display system of claim 23, wherein the memory comprises further instructions that when executed by the dedicated electronic processor cause the display system to:
delay in a transition condition if the first signal or the second signal is not received.

25. The display system of claim 22, wherein the proximity sensor is a laser range finder.

26. The display system of claim 22, wherein the memory comprises further instructions that when executed by the dedicated electronic processor, cause the display system to:
collect a set of sensor metrics based on the first signal and the second signal.

27. The display system of claim 26, further comprising:
a communications module connected to a network:
a server, in communication with the communications module through the network; and
the memory comprises further instructions that when executed by the dedicated electronic processor, cause the display system to:
upload the set of sensor metrics, through the communications module, to the server.

28. A method of using a modular content display unit comprising:
providing a modular controller, having a processor operatively connected to a removable memory and an on-board memory;
providing a battery, of a set of a batteries, connected to the processor;
providing a display, of a set of displays, operatively connected to the processor;
electronically optimizing the display to the battery for low power consumption;
providing a first sensor connected to the processor;
providing a second sensor, connected to the processor;
providing a first support substrate, having a first observation window, and physically attaching the display to the first support substrate so that it is visible through the first observation window;
loading a content file on the removable memory; and
providing a set of instructions in the on-board memory, that when executed cause the processor to carry out the steps of:
activating the processor in a low power condition where the display is set to a first power usage setting, until a first signal is received from the first sensor;
transitioning the display to a standby condition, where the display is set to a second power usage setting, until a second signal is received from the second sensor;
transitioning the display to an active condition, where the display is set to a third power usage setting, and playing the content file, until neither the first signal nor the second signal is present;
transitioning to the low power condition, upon a timeout condition;
retrieving a battery status from the battery in one of a discharge state and an end of discharge state;
overriding the low power condition, the standby condition and the active condition upon the battery status reporting the discharge state and resetting the display to a fourth power usage setting;
wherein during the discharge state, the battery exhibits a first voltage drop rate;
wherein during the end of discharge state, the battery exhibits a second voltage drop rate;
wherein the second voltage drop rate is greater than the first voltage drop rate;
overriding the low power condition, the standby condition and the active condition upon the battery status reporting the end of discharge state and resetting the display to a fifth power usage setting; and
locking the display in one of the fourth power usage setting and the fifth power usage setting until the processor is deactivated.

29. The method of claim 28, further comprising:
removing the modular controller from the first support substrate;
discarding the first support substrate; and
providing a second support substrate, having a second observation window, and physically attaching the display to the second support substrate so that the display is visible through the second observation window.

30. The method of claim 29, further comprising:
recharging the battery.

31. The method of claim 30, further comprising:
replacing the battery.

* * * * *